United States Patent [19]

Horiguchi et al.

[11] Patent Number: 4,997,277
[45] Date of Patent: Mar. 5, 1991

[54] OPTICAL FIBER EVALUATION METHOD AND SYSTEM

[75] Inventors: Tsuneo Horiguchi; Mitsuhiro Tateda, both of Mito, Japan

[73] Assignee: Nippon Telegraph and Telephone Corporation, Tokyo, Japan

[21] Appl. No.: 370,220

[22] Filed: Jun. 21, 1989

[30] Foreign Application Priority Data

Jun. 24, 1988 [JP] Japan ................... 63-154828

[51] Int. Cl.⁵ .................................. G01N 21/00
[52] U.S. Cl. ...................................... 356/73.1
[58] Field of Search ............. 356/73.1, 223, 345, 356/350; 350/96.16

[56] References Cited

U.S. PATENT DOCUMENTS

| | | | |
|---|---|---|---|
| 4,159,178 | 6/1979 | Vali et al. | 356/350 |
| 4,309,604 | 1/1982 | Yoshikawa et al. | 356/223 |
| 4,560,246 | 12/1985 | Cotter | 350/96.16 |
| 4,859,017 | 8/1989 | Brierley et al. | 356/345 |

OTHER PUBLICATIONS

M. K. Barnoski et al.; "Optical time Domain Reflectometer", Appl. Opt., 1977, vol. 16, pp. 2375–2379.
F. P. Kapron et al.; "Aspect of Optical Frequency-Domain Reflectometry", Tech. Digest of 100C '81, 1981, p. 106.
M. C. Farries et al.; "Distributed Sensing Using Stimulated Raman Interaction in a Monomode Optical Fiber", Symposium of Optical Fiber Sensing, '84, pp. 121–132.

Primary Examiner—Vincent P. McGraw
Assistant Examiner—LaCharles P. Keesee
Attorney, Agent, or Firm—Spencer & Frank

[57] ABSTRACT

Use is made of a non linear interaction between a first modulated signal light from a first light source and a second signal light from a second light source which propagate in an optical fiber to be examined in opposite directions, i.e., so-called Brillouin light amplification, to analyze the signal waveform of the second signal light, which is influenced by the action of such light amplification.

15 Claims, 15 Drawing Sheets

OPTICAL FIBER EVALUATION METHOD AND SYSTEM

BACKGROUND OF THE INVENTION

1. Field of the Invention

The present invention relates to a method and an apparatus for evaluating the distribution of various properties of an optical fiber along its longitudinal direction, such as optical loss in the optical fiber (optical attenuation), the relative refractive index difference between the core and cladding, core diameter, variation in stresses applied to the optical fiber and influence of temperature change on the optical fiber.

2. Prior Art

As means for determining the distribution of the loss of an optical fiber along its longitudinal direction, there has been proposed optical time domain reflectometry (hereinafter referred to as "OTDR") in which Rayleigh back-scattered light generated in an optical fiber is detected (see, for instance, M K, Barnoski et al., Appl. Opt., 1977, Vol. 16, pp. 2375-2379, "Optical time domain reflectometer"). This method has been improved over 10 years since it was proposed and at present becomes an indispensable technique for the installation of an optical communication network and for the maintenance thereof. There has also been proposed an optical frequency-domain reflectometry (hereinafter referred to as "OFDR") in which Rayleigh back-scattered light is analyzed in the frequency domain, while the OTDR method analyzes it in time domain (see, for instance, F P Kapron et al., Tech. Digest of IOOC'81, 1981, p. 106, "Aspect of optical frequency-domain reflectometry"). These OTDR and OFDR methods have almost reached the stage of completion.

However, since the strength of the back-scattered light is very weak, it is difficult to increase the precision of its measurement even if the signal to noise ratio is improved with a device such as an averaging device.

A typical value of measurable one-way optical loss of commercially available OTDR apparatuses is about 20 dB when the input optical power within the test fiber is about 1 mW; the distance resolution is 100 m (optical pulse width=1 microsecond) and the average processing time is on the order of one minute. In order to extend the dynamic range (i,e., measurable maximum optical attenuation of an optical fiber), it is required to employ large-scale high power lasers, represented by YAG lasers, and/or to make a sacrifice of the spatial resolution and/or measurement time.

Furthermore, the amount of light reflected at the light input endface of the test fiber or connectors in the optical transmission line is greater than the Rayleigh scattered light by 3 or 4 orders of magnitude and this results in saturation of a photo detector. For this reason, a back-scattered light cannot be measured over a certain distance ahead of the reflection point and thus a so-called dead zone is formed.

An attempt for determining stresses in an optical fiber was reported by M.C. Farries et al., where they observed Raman scattering amplification in an optical fiber when two lights having different wavelengths are counterpropagated in the fiber (Tech Digest in OFS (Symposium of Optical Fiber Sensing) '84, pp. 121-132, entitled "DISTRIBUTED SENSING USING STIMULATED RAMAN INTERACTION IN A MONOMODE OPTICAL FIBRE") by M. C. Farries et al. Although, in this report, the signal waveform change due to stress is recognized, there is no quantitative relationship between the stress and the waveform change and it failed to locate the position at which the stress is applied. This is because the technique in the above mentioned report utilizes the polarization effect on Raman optical amplification gain, but it is difficult to interpret a double-pass integrated polarization state in terms of the stress applied to the fiber.

SUMMARY OF THE INVENTION

Accordingly, an object of the present invention is to provide a method and an apparatus for evaluating properties of an optical fiber which makes it possible to determine with high precision the distribution of various properties of the optical fiber along its longitudinal direction, such as optical loss in the optical fiber, the relative refractive index difference between the core and cladding, core diameter, variation in stresses applied to the optical fiber and influence of temperature change on the optical fiber.

Another object of the present invention is to provide a method and an apparatus for evaluating optical fiber attenuation characteristics, whose dynamic range is greater than that achieved by the conventional OTDR technique by 10 dB or more even using lasers having only a few mW light power.

To achieve the objects, the present invention makes use of a non-linear interaction between a first modulated signal light from a first light source and a second signal light from a second light source which counter propagate in an optical fiber to be examined, i.e., so called Brillouin light amplification, and analyzes the signal waveform of the second signal light which is influenced by Brillouin light amplification.

The principle of Brillouin light amplification is as follows. When a light is made incident upon a substance such as an optical fiber, an acoustic wave is induced by the incident light itself, and simultaneously, the acoustic wave generates light (Stokes light) having a frequency lower than that of the incident light. If the strength of the incident light is further increased, strong Stokes light having a coherent phase is scattered in the direction opposite to the incident light. This is the phenomenon of stimulated Brillouin light amplification.

Accordingly, if the optical frequency of either the first or the second signal light is equal to the optical frequency of the Stokes light, the signal light can be amplified by the stimulated Brillouin scattering mentioned above.

As explained above, in the present invention, an optical fiber is characterized by the signal light waveform change due to the non-linear effect of Brillouin light amplification and, therefore, the present invention is quite different from the conventional techniques such as OTDR in which the optical loss distribution in an optical fiber along its longitudinal direction is evaluated by measuring the Rayleigh back-scattered light, which is generated through a linear scattering process.

Moreover, the present invention completely differs from the technique described in the aforementioned Farries' report. Farries' technique utilizes the polarization effects on Raman gain, while the present invention utilizes Brillouin gain averaged over polarization states as well as the change of Brillouin frequency shift due to fiber properties.

In a first aspect of the present invention, a method for evaluating properties of an optical fiber, comprises the steps of:

making incident a first signal light in the form of modulated light from a first light source upon an optical fiber to be measured;

propagating a second signal light from a second light source in the optical fiber in the direction opposite to that of the first signal light, while controlling at least one of the first and second light sources, so that Brillouin light amplification is caused, by providing a specific frequency difference between the first signal light and the second signal light;

detecting the second signal light which is Brillouin-light-amplified; and evaluating the properties of the optical fiber based on the detected second signal light.

Here, in the detection of the second signal light which is Brillouin-light-amplified, the evaluation of the properties of the optical fiber may be performed by changing the polarization state of at least one of the first signal light and the second signal light during one or a plurality of measurements to detect the second signal light which is Brillouin-light-amplified with respect to the average relative polarization state of the first signal light and the second signal light and then to analyze change of a waveform in time or amplitude and phase changes of the second signal light.

The method may further comprise the steps of:

assigning f1 and f2 to the respective optical frequencies of the first signal light and the second signal light so that the frequencies f1 and f2 satisfy the relation $f1-f2=fB$ (wherein fB is the Brillouin frequency shift);

detecting the second signal light which is Brillouin-light-amplified to obtain a time dependent waveform WA of the detected second signal light;

assigning f1' and f2' to optical frequencies of the first signal light and the second signal light so that the frequencies f1' and f2' satisfy the relation $f2'-f1'=fB$;

detecting the second signal light which is Brillouin-light-amplified to obtain a time dependent waveform WB of the detected second signal light; and analyzing the arithmetic or geometric mean of the waveforms WA and WB to evaluate the properties of the optical fiber.

The first signal light from the first light source may be amplitude-modulated or frequency-modulated in the form of pulses and the second signal light from the second light source has a constant amplitude and frequency without being modulated and wherein the loss distribution properties and the core diameter distribution properties of the optical fiber is evaluated as a slope distribution of the logarithmical expression of an amplitude change in time of the detected second signal light which is Brillouin-light-amplified. The method may comprise the steps of:

fixing the frequency difference $fB=|f1-f2|$ between the optical frequencies f1 and f2 of the lights from the first light source and the second light source to a plurality of values fB1, fB2;

detecting, for each fixed value, a time dependent waveform of the second signal light which is Brillouin-light-amplified;

finding out, at each position of the optical fiber to be measured, the optical frequency difference (maximum gain Brillouin frequency shift) at which the Brillouin light amplification effect becomes maximum from the plurality of the time dependent waveforms; and evaluating the stress distribution, temperature distribution and relative refractive index difference distribution in the optical fiber to be measured from the position-dependence of the maximum gain Brillouin frequency shift in the optical fiber. The loss distribution and core diameter distribution in the optical fiber may be evaluated by expanding an oscillation linewidth of at least one of the first and second light sources so as to be wider than that of Brillouin light amplification bandwidth of the optical fiber to be measured.

The first signal light from the first light source may be amplitude-modulated or frequency-modulated in the form of pulses and the second signal light from the second light source has a constant amplitude and frequency without being modulated and wherein the loss distribution properties and core diameter distribution properties of the optical fiber are evaluated as a slope distribution of the logarithmical expression of an amplitude change in time of the detected second signal light which is Brillouin-light-amplified.

The method may comprise the steps of:

fixing the frequency difference $fB=|f1-f2|$ between the optical frequencies f1 and f2 of the lights from the first light source and the second light source to a plurality of values fB1, fB2;

detecting, for each fixed value, a time dependent waveform of the second signal light which is Brillouin-light-amplified;

finding out, at each position of the optical fiber to be measured, the optical frequency difference (maximum gain Brillouin frequency shift) at which the Brillouin light amplification effect becomes maximum from the plurality of the time dependent waveforms; and evaluating the stress distribution, temperature and relative refractive index difference distribution in the optical fiber to be measured from the position-dependence of the maximum gain Brillouin frequency shift in the optical fiber.

The loss distribution and core and diameter distribution in the optical fiber may be evaluated by expanding an oscillation linewidth of at least one of the first and second light sources so as to be wider than that of Brillouin light amplification bandwidth of the optical fiber to be measured.

Here, the first signal light from the first light source may be amplitude-modulated or frequency-modulated in the form of pulses and the second signal light from the second light source has a constant amplitude and frequency without being modulated and wherein the loss distribution properties and core diameter distribution properties of the optical fiber are evaluated as a slope distribution of the logarithmical expression of an amplitude change in time of the detected second signal light which is Brillouin-light-amplified. The loss distribution and core diameter distribution in the optical fiber may be evaluated by expanding an oscillation linewidth of at least one of the first and second light sources so as to be wider than that of Brillouin light amplification bandwidth of the optical fiber to be measured.

The method may comprise the steps of:

fixing the frequency difference $fB=|f1-f2|$ between the optical frequencies f1 and f2 of the lights from the first light source and the second light source, to a plurality of values fB1, fB2;

detecting, for each fixed value, a time dependent waveform of the second signal light which is Brillouin-light-amplified;

finding out, at each position of the optical fiber to be measured, the optical frequency difference (maximum gain Brillouin frequency shift) at which the Brillouin light amplification effect becomes maximum from the plurality of the time dependent waveforms; and evaluating the stress distribution, temperature distribution and relative refractive index difference distribution in the optical fiber to be measured from the position-dependence of the maximum gain Brillouin frequency shift in the optical fiber.

The loss distribution and core diameter distribution in the optical fiber may be evaluated by expanding a spectral linewidth of at least one of the first and second light sources so as to be wider than that of Brillouin light amplification bandwidth of the optical fiber to be measured.

In a second aspect of the present invention, a system for evaluating the properties of an optical fiber, may comprise:

a first light source for emitting a first signal light in the form of modulated light;

a second light source for emitting a second signal light which propagates in the optical fiber to be measured in the direction opposite to that of the first signal light;

an optical frequency controlling means for controlling the frequency difference between the first signal light and the second signal light:

an optical multi-demultiplexing means for making the first signal light incident upon the optical fiber to be measured and for extracting a Brillouin-light-amplified second signal light which is amplified through Brillouin light amplification induced by the first signal light and the second signal light;

a photo detecting means for converting the Brillouin-light-amplified second signal light from the optical multi-demultiplexing means, into an electric signal; and a signal processing means for processing and analyzing the time dependent waveform or amplitude and phase of the electric signal from the photo detecting means.

Here, the optical frequency controlling means may be a two-output stabilized voltage source which provides a constant voltage E1 and a variable voltage E2=E1+ΔE or a two-output stabilized current source which provides a constant current I1 and a variable current I2=I1+ΔI and the frequency difference between the first and second light sources is controlled by supplying E1 or I1 to one of the first and second light sources and E2 and I2 to the other of the first and second light sources.

The optical frequency controlling means may have two independent (a first and a second) optical frequency controlling portions, the first optical frequency controlling portion being a variable stabilized voltage source or a variable stabilized current source for changing the voltage or current to be supplied to the first light source so as to maximize or minimize the signal level detected by the photo detecting means and the second optical frequency controlling portion being a constant voltage source or a constant current source for stabilizing the frequency of the second light source independently of the state of the first light source.

The optical frequency controlling means may have two independent (a first and a second) optical frequency controlling portions, the first optical frequency controlling portion being a variable stabilized voltage source or a variable stabilized current source for detecting a beat signal based on the frequency difference between the first and second light sources among signals detected by the photo detecting means and for changing the voltage or current to be supplied to the first light source so that a frequency difference between a predetermined reference beat frequency and the beat frequency actually detected becomes zero, and the second optical frequency controlling portion being a constant voltage source or a constant current source for stabilizing the frequency of the second light source independently of the state of the first light source.

In a third aspect of the present invention, a system for evaluating the properties of an optical fiber, may comprise:

a first light source for emitting a first signal light in the form of modulated light;

a second light source for emitting a second signal light which propagates in the optical fiber to be measured in the direction opposite to that of the first signal light;

an optical frequency controlling means for controlling the frequency difference between the first signal light and the second signal light:

an optical multi-demultiplexing means for making the first signal light incident upon the optical fiber to be measured and for extracting a Brillouin-light-amplified second signal light which is amplified through Brillouin light amplification induced by the first signal light and the second signal light;

an optical frequency filter receiving the Brillouin-light-amplified second signal light from the optical multi-demultiplexing means and for filtering the Brillouin-light-amplified second signal light in such a way that light having the frequency of the Brillouin-light-amplified second signal light is passed but light having the frequency of the first signal light is interrupted;

a photo detecting means for converting the output light from the optical frequency filter into an electric signal; and a signal processing means for processing and analyzing the time dependent waveform or amplitude and phase of the electric signal from the photo detecting means.

Here, the optical frequency controlling means may be a two-output stabilized voltage source which provides a constant voltage E1 and a variable voltage E2=E1+ΔE or a two-output stabilized current source which provides a constant current I1 and a variable current I2=I1+ΔI and the frequency difference between the first and second light sources is controlled by supplying E1 or I1 to one of the first and second light sources and E2 and I2 to the other of the first and second light sources.

The optical frequency controlling means may have two independent (a first and a second) optical frequency controlling portions, the first optical frequency controlling portion being a variable stabilized voltage source or a variable stabilized current source for changing the voltage or current to be supplied to the first light source so as to maximize or minimize the signal level detected by the photo detecting means and the second optical frequency controlling portion being a constant voltage source or a constant current source for stabilizing the frequency of the second light source independently of the state of the first light source.

In a fourth aspect of the present invention, a system for evaluating properties of an optical fiber, may comprise:

a first light source for emitting a first signal light in the form of modulated light;

a second light source for emitting a second signal light which propagates in the optical fiber to be measured in the direction opposite to that of the first signal light;

an optical frequency controlling means for controlling the frequency difference between the first signal light and the second signal light;

an optical multi-demultiplexing means for making the first signal light incident upon the optical fiber to be measured and for extracting a Brillouin-light-amplified second signal light which is amplified through Brillouin light amplification induced by the first signal light and the second signal light;

an optical frequency filter receiving the Brillouin-light-amplified second signal light from the optical multi-demultiplexing means and for filtering the Brillouin-light-amplified second signal light in such away that light having the frequency of the Brillouin-light-amplified second signal light is passed by light having the frequency of the first signal light is interrupted;

a photo detecting means for converting the output light from the optical frequency filter into an electric signal;

a signal processing means for processing and analyzing the time dependent waveform or amplitude and phase of the electric signal from the photo detecting means; and means for changing the polarization state of at least one of the first signal light and the second signal light.

The optical frequency controlling means may be a two-output stabilized voltage source which provides a constant voltage E1 and a variable voltage E2=E1+ΔE or a two-output stabilized current source which provides a constant current I1 and a variable current I2=I1+ΔI and the frequency difference between the first and second light sources is controlled by supplying E1 or I1 to one of the first and second light sources and E2 and I2 to the other of the first and second light sources.

The optical frequency controlling means may have two independent (a first and a second) optical frequency controlling portions, the first optical frequency controlling portion being a variable stabilized voltage source or a variable stabilized current source for changing the voltage or current to be supplied to the first light source so as to maximize or minimize the signal level detected by the photo detecting means and the second optical frequency controlling portion being a constant voltage source or a constant current source for stabilizing the frequency of the second light source independently of the state of the first light source.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiment 1

Figure 1:
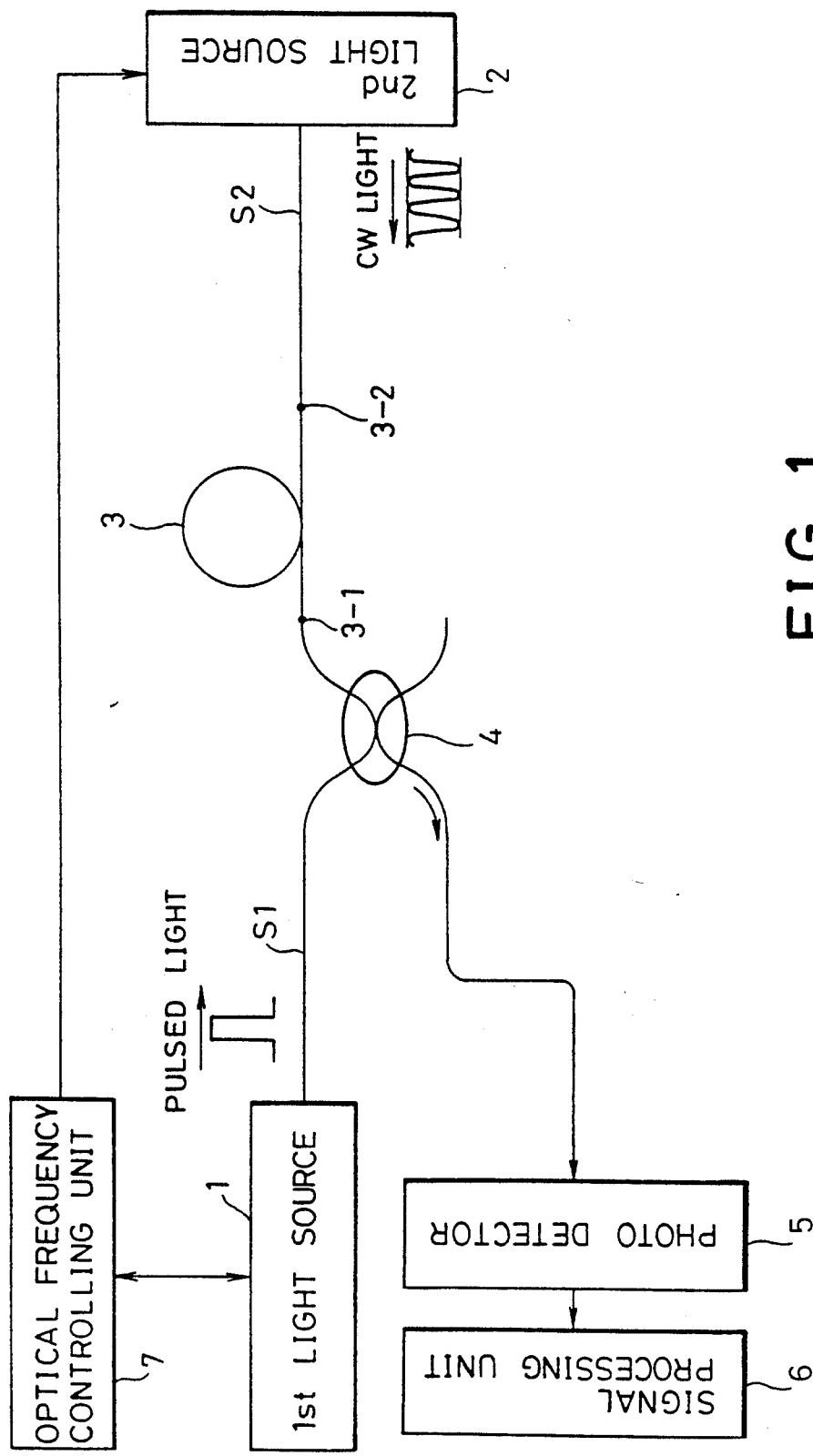
FIG. 1 is a schematic diagram showing an arrangement of Embodiment 1 according to the present invention.

FIG. 1 shows Embodiment 1 of an evaluation apparatus in accordance with the present invention. In FIG. 1, reference numeral 1 denotes the first light source emitting a pulsed light which is amplitude-modulated or frequency-modulated in pulse-like form and the light source 1 emits a light having a narrow spectrum linewidth. The first light source 1 can be arranged as follows. That is, a light from a single longitudinal mode laser, such as a CW operation YAG laser or a CW operation DFB laser, is amplitude-modulated in the pulse-like form by driving an acoustooptic modulator. Alternatively, the pulsed light can be realized by injecting a current into a single longitudinal mode laser such as a CW operation DFB laser. Reference numeral 2 denotes the second light source of CW operation having a narrow spectrum linewidth such as a YAG laser or a frequency tunable DFB laser. Reference numeral 3 denotes an optical fiber to be examined or measured, 4 an optical multi-demultiplexer, 5 a photo detector such as a Ge-APD (Avalanche Photo Diode). Reference numeral 6 denotes a signal processing unit which receives the electric signal from the photo detector 5 and processes it to analyze the time-dependence, the amplitude and/or the phase of the signal. Reference number 7 denotes an optical frequency controlling unit for controlling the frequency difference between the lights from the first and second light sources 1 and 2 to a desired value. Details of the units 6 and 7 will be described below.

The evaluation apparatus operates as follows:

A pulse-like light emitted from the first light source 1, i.e., the first signal light S1, is coupled to the optical fiber 3 to be examined through the optical multi-demultiplexer 4. On the other hand, the light emitted from the second light source 2. i.e., the second signal light S2, is launched from the end 3-2 of the optical fiber 3 to be examined, which is opposite to the end 3-1 of the optical fiber 3 at which the first signal light S1 is launched.

At this stage, the frequency f1 of the first signal light and the frequency f2 of the second signal light are controlled by the optical frequency controlling unit 7 so as to fulfill the following relation:

$$f1 - f2 = FB \quad (1)$$

Here, fB is the Brillouin frequency shift inherent to the optical fiber 3 to be examined. For instance, for a silica fiber, fB is about 13 GHz at a wavelength of 1.3 micron meters. When equation (1) is satisfied, the second signal light S2 is amplified by the first signal light S1 through the Brillouin light amplification process. The waveform of the second signal light S2 detected by the photo detector 5 can be derived as follows.

The gain g of the second signal light S2 due to the Brillouin light amplification at a position z is expressed by the following equation when $g - 1 < 1$:

$$g = 1 + AP1(z) \quad (2)$$

Here, A is a proportionality factor, and z represents the position at which the first signal light S1 (a pulsed signal) propagating through the optical fiber 3 to be examined is located, wherein the end 3-1 of the optical fiber 3 is chosen as the reference point. P1(z) represents the light power of the first signal light S1 at the position z. Likewise, P2(z) is the light power of the second signal light S2 at the position z. The optical loss in the optical fiber 3 and its length are denoted as $\alpha$(neper/m) and L (m), respectively. We can assume that the optical losses for the first signal light S1 and the second signal light S2 are identical, since the frequency difference between these signal lights is quite small. Under this condition, P1(z) and P2(z) can be expressed as follows, respectively:

$$P1(z) = P1(O) \cdot \exp(-\alpha z) \quad (3-1)$$

$$P2(z) = P2(L) \cdot \exp[-\alpha(L-z)] \quad (3-2)$$

Considering equations (2) and (3) together with the attenuation factor exp($-\alpha z$) of the second signal light S2 due to the optical fiber loss between the points O and z, the power $\overline{P2(z)}$ of the second signal light S2 detected by the photo detector 5 is expressed by the following relation:

$$\overline{P2(z)} = g \cdot P2 \cdot \exp(-\alpha z)$$
$$= P2(L) \cdot \exp(-\alpha L) + A \cdot P1(O) \cdot P2(L) \cdot \exp(-\alpha L) \cdot \exp(-\alpha z) \quad (4)$$

Here, the optical loss of the optical multi-demultiplexer 4 is neglected. The first term on the right side of equation (4) is a DC component and the second term corresponds to a component increased due to the Brillouin light amplification. A time t at which the second signal light S2 Brillouin-amplified at the position z is detected by the photo detector 5, is expressed by the following relation, $$t = 2z/v \quad (5)$$

where V denotes the velocity of light. The time at which the signal light S1 is injected in the fiber 3 is chosen as the time origin. Therefore, the waveform of the received light signal level becomes as shown in FIG. 2.

Figure 2:
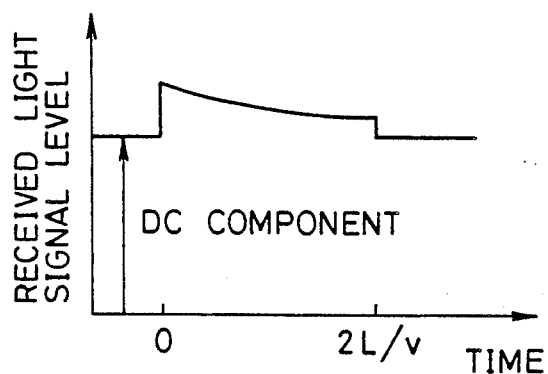
FIG. 2 is a waveform diagram illustrating an example of waveform which is measured according to the present invention.

In FIG. 2, the optical loss $\alpha$ of the optical fiber 3 to be examined can be obtained from the attenuation factor of the Brillouin amplified component or from the difference between the received light signal levels at arbitrary points. Comparing the present invention with the conventional OTDR, it is easily understood that they differ from each other in the following two points:

(1) The attenuation factor of the waveform according to the conventional OTDR is exp ($-2\alpha z$) and thus the signal level rapidly decreases, while that of the present invention is exp ($-\alpha z$) and thus the attenuation factor of the signal level is small. (2) As seen from equation (4), in the present invention, the received light signal level can be increased by increasing the light power of the second light source 2.

Therefore, according to the present invention, the received light signal level can be greatly increased and thus the measurement accuracy can be improved, compared with the conventional OTDR.

In the foregoing explanation, the optical loss $\alpha$ in the optical fiber 3 is assumed to be uniform throughout the fiber. However, even if the loss in the optical fiber 3 along its longitudinal direction is not uniform, the distribution of the loss in the optical fiber 3 to be examined along its longitudinal direction can be determined by utilizing the measuring system shown in FIG. 1. More specifically, such a loss distribution can be determined according to the foregoing procedures by, for instance, separately measuring every interval of such an optical fiber, in which interval the optical loss is uniform.

Figure 3:
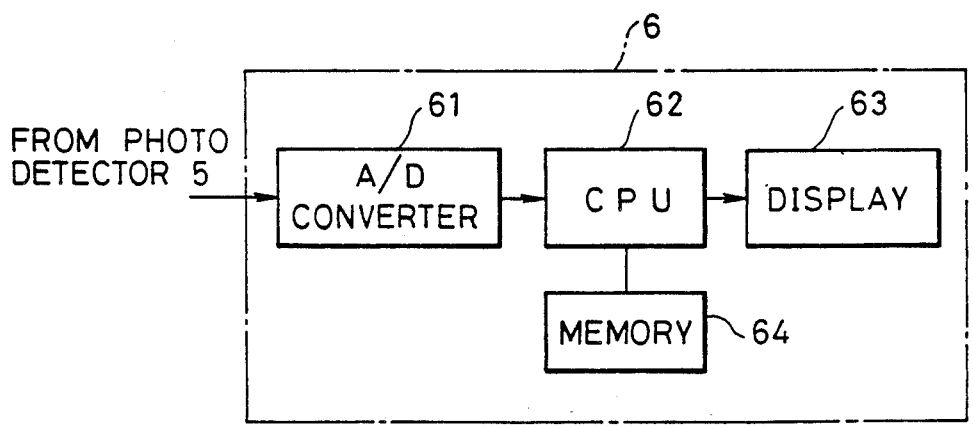
FIG. 3 is a block diagram showing an embodiment of the signal processing apparatus shown in FIG. 1.

Referring now to FIG. 3, there is depicted an embodiment of the signal processing unit 6 shown in FIG. 1. In FIG. 3, reference numeral 61 represents an A/D converter for converting the analog output from the photo detector 5 into a digital signal, 62 represents a CPU for processing the output from the A/D converter 61 as will be explained below, 63 represents an output unit such as a CRT display or a printer and 64 represents a memory.

The measured waveform obtained in one measurement by the photo detector 5, is shown in FIG. 2. If we denote the received light signal level as W, this waveform in one measurement can be expressed as W(z), since the time t has the following relation with the position coordinate z along the optical fiber 3 to be examined, as shown in equation (5). Numbers of waveforms can be successively obtained by repeatedly launching light pulses into the optical fiber 3 to be examined from the first light source 1. Thus, the measured waveform of the k-th pulse can be expressed by WK(z) where k represents the serial number of pulse. Moreover, the measured waveform can be defined as a function of the operation parameters of the whole evaluation apparatus of this invention. In other words, the waveform is a function of the frequency difference $\Delta f$ (Hz) between the first and second light sources 1 and 2 and their relative polarizing angle $\theta$ (rad). Therefore, the general form of the measured waveform will be expressed as $Wk(z, \Delta f, \theta)$ hereinafter.

The measured waveform $Wk(z, \Delta f, \theta)$ obtained at the photo detector 5 is converted into a digital signal in the A/D convertor 61 and then inputted to the CPU 62. In the CPU 62, various processings are performed according to the properties of the optical fiber 3 to be evaluated. For instance, an averaging processing on a number of measured waveforms whose $\Delta f$ and $\theta$ are fixed is performed in order to improve the signal to noise ratio. This processing is, for instance, defined by the following relation:

$$W(z, \Delta f, \theta) = (1/N) \sum_{k=1}^{N} Wk(z, \Delta f, \theta).$$

In order to obtain the loss distribution from this waveform, logarithmic conversion and differential processing are performed in the CPU 61. In other words, this processing can be expressed by the following formula:

$$\alpha = -d\, ln\{W(z, \Delta f, \theta)\}/dz \qquad \text{(neper/m)}.$$

These processings are almost the same as those in the conventional OTDER. For instance, the signal processing apparatus employed in an OTDER apparatus "OF 152 FIBER OPTIC TDR" manufactured by Tektronix can be used as the signal processing unit 6.

Moreover, the processing for compensating the Brillouin gain fluctuation dependent on the relative polarizing angle between the first and second light sources 1 and 2 can be expressed by $$W(z, \Delta f) = \int W(z, \Delta f, \theta)\, d\theta.$$

In addition, at every position z in the optical fiber 3 to be measured, a relative frequency $\Delta f(z)$ which provides the maximum wave height is obtained. That is, $\Delta f(z)$ which satisfies the following relation is obtained:

$$W(z, \Delta f(z)) \geq W(z, \Delta f).$$

The physical meanings and an explanation of these processings will be explained in the following embodiments.

An embodiment of the optical frequency controlling unit 7 will be explained in detail.

In general, the frequency of a laser light can be controlled by applying a voltage to the laser device or injecting a current to the laser device, utilizing thermal effects or optoelectric effects such as plasma effects or interactions therebetween.

Figure 4:
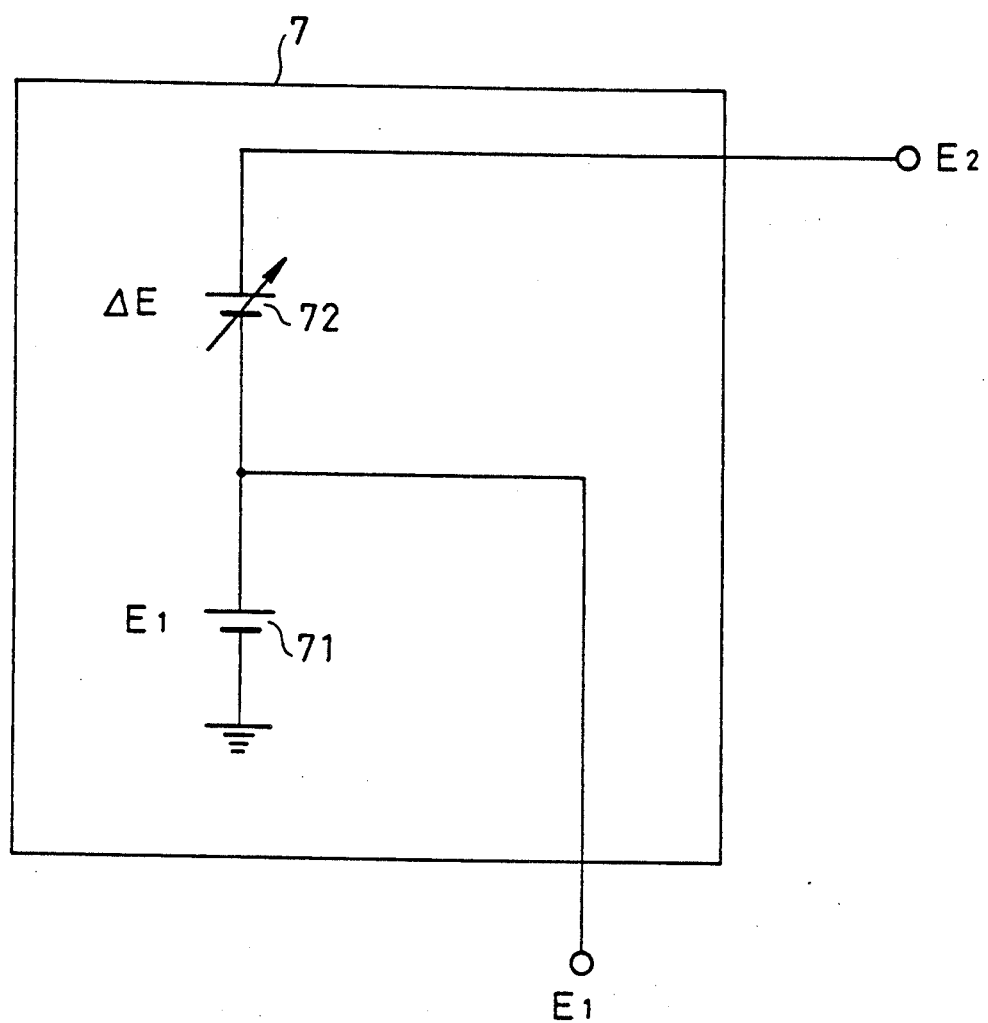
FIG. 4 is a circuit diagram showing an embodiment of the optical frequency controlling apparatus shown in FIG. 1.

FIG. 4 shows an embodiment of the frequency controlling unit 7 in which the frequency is adjusted by controlling the voltage applied to the laser device. In FIG. 4, a voltage E1 is applied to the first light source 1 by a constant power supply 71 and a voltage E2 (=E1+$\Delta$E) is applied to the second light source 2 by the constant voltage power supply 71 and a variable stabilized power supply 72. By changing $\Delta$E through the control of the power supply 72, the relative frequency $\Delta f = f1 - f2$ between the first and second light sources 1 and 2 can be controlled to a desired value. Here, $\Delta f$ is proportional to $\Delta E$ within a practical range. For instance, in the case of a Ring YAG laser Model 102 manufactured by Lightwave Electronics Co., $\Delta f/\Delta E = 1.2$ GHz/V.

Embodiment 2

While in the foregoing Embodiment 1, the frequencies of the first and second light sources 1 and 2 are controlled by the single frequency controlling unit 7, the respective frequencies of the first and second light sources 1 and 2 can also be separately controlled by using two frequency controlling units.

Figure 5:
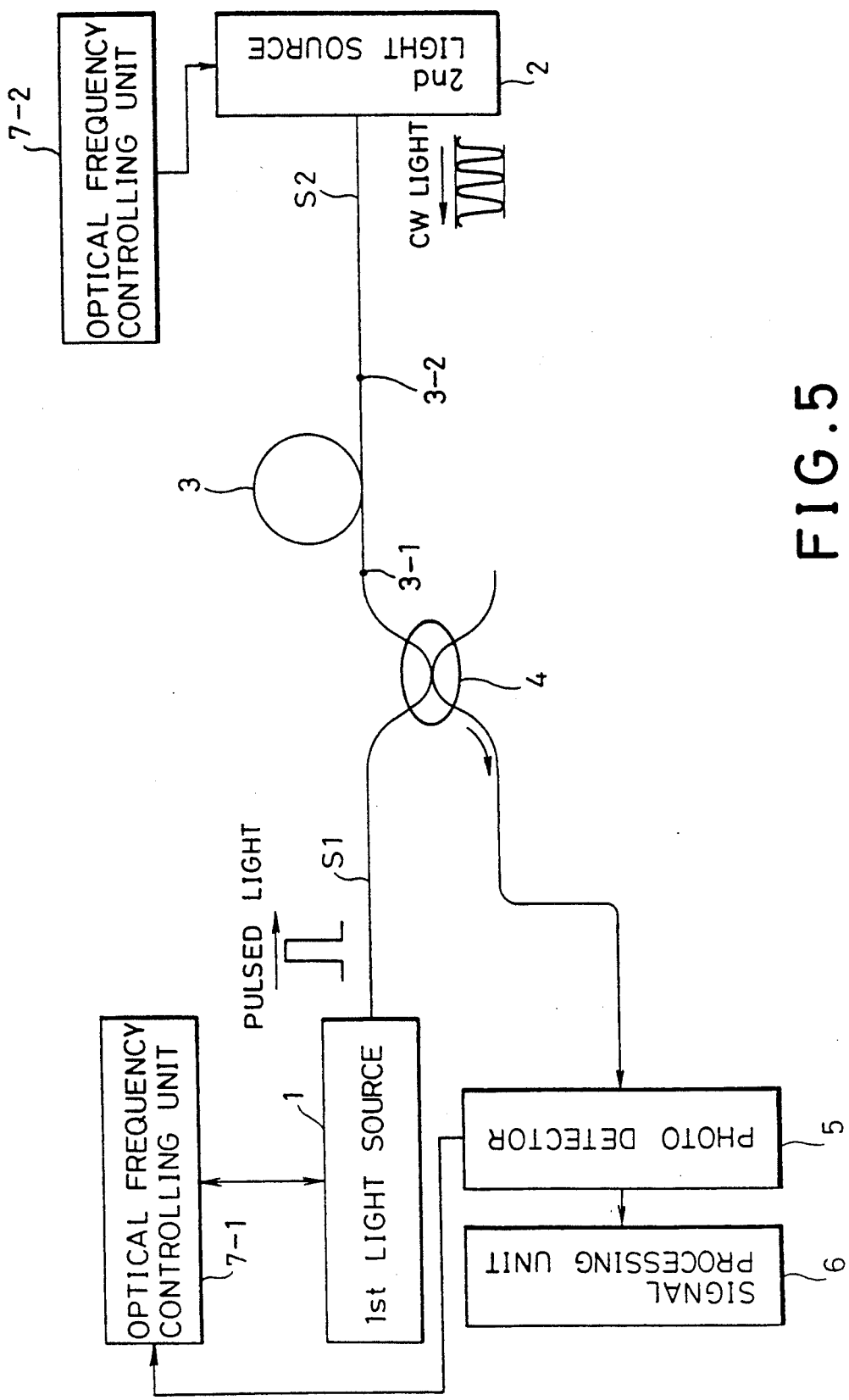
FIG. 5 is a schematic diagram showing an arrangement of Embodiment 2 according to the present invention.

FIG. 5 is a diagram showing the second embodiment of the present invention. In this embodiment, the first light source 1 and the second light source 2 are controlled by independently arranged optical frequency controlling units 7-1 and 7-2, respectively. The optical frequency controlling unit 7-1 is the same as that used in Embodiment 1 except that it is controlled by an output from the photo detector 5. In addition, the second light source 2 is voltage- or current-controlled by the optical frequency controlling unit 7-2 so that the deviation of the frequency f2 from a predetermined frequency f20, i.e., |f2−f20| is within a predetermined set value.

On the other hand, the frequency of the first light source 1 is controlled by the light frequency controlling unit 7-1 in accordance with the output from the photo detector 5, so that the frequency difference between the first and second light sources 1 and 2 coincides with the desired value. More specifically, there are two useful methods for controlling the frequency. In one method the output signal level of the photo detector 5 is maximized, and in the other method, the frequency of the beat component is adjusted to a predetermined value.

Figure 6:
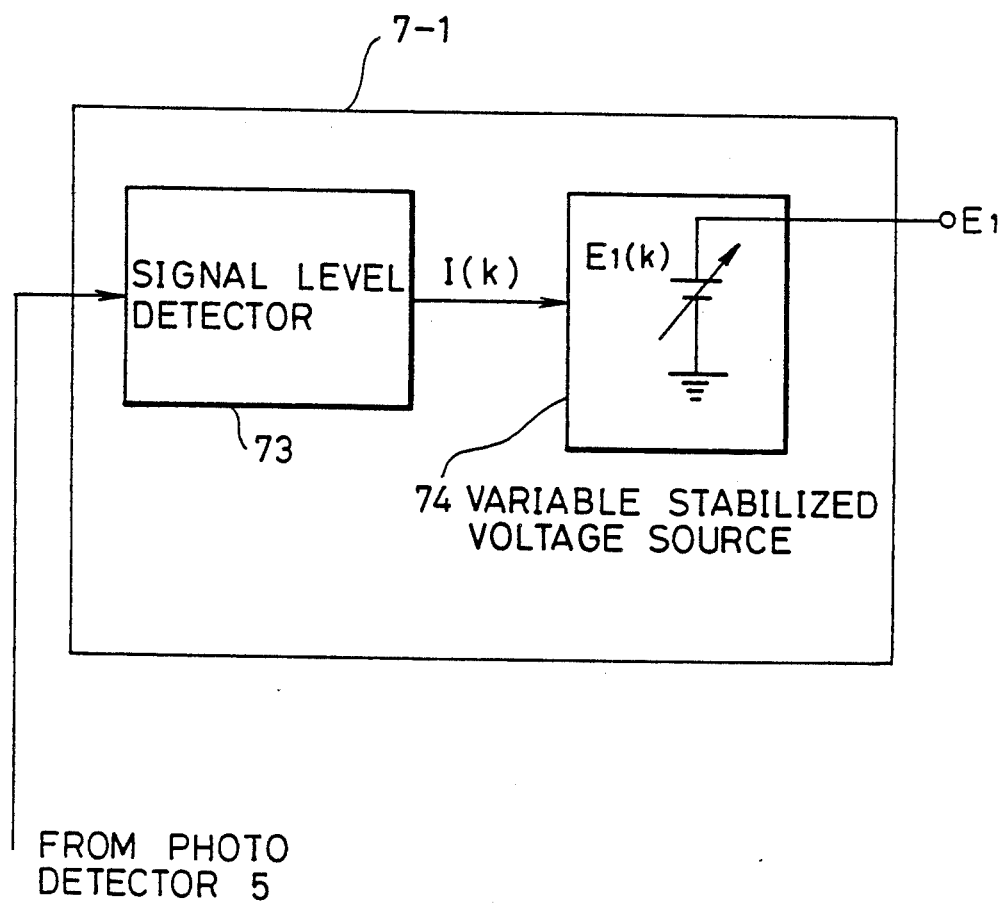
FIGS. 6 and 7 are block diagrams showing two embodiments of the optical frequency controlling apparatus.

FIG. 6 shows a specific embodiment of an arrangement of the optical frequency controlling unit 7-1 for maximizing the output signal level of the photo detector 5. The unit 7-1 controls the output voltage E(k) of the variable stabilized power supply 74 by the signal level I(k) obtained at a signal level detector 73, to which the light intensity signal is fed from the photo detector 5. As was mentioned above, when the frequency difference $\Delta f = f1 - f2$ between the first and second light sources 1 and 2 coincides with the Brillouin frequency shift fB inherent to the optical fiber to be measured, the probe light from the second light source 2 is Brillouin-amplified. Therefore, if the condition for maximizing the output from the photo detector 5 can be maintained, the intended measurement of the present invention can be performed without correctly determining the frequency value fB. In a specific example, when the voltage applied to the first light source 1 is E1(k) and the detected signal level of the signal level detector 73 is I(k) at time t(k), an output voltage E1(k+1) of the variable stabilized power supply 74, i.e., a voltage applied to the first light source 1 at time t(k+1), is determined by the following relation:

$$E1(k+1)=E1(k)+A\{I(k)-I(k-1)\}/\{E1(k)-E1(k-1)\}.$$

wherein A represents an appropriate proportionality factor. As will be explained below, even if the frequencies of the first and second light sources 1 and 2 are so determined that f2−f1=fB is established, the optical loss can be measured. In this case, since the second signal light loses its energy through the Brillouin-interaction with the first signal light, the signal level detected by the photo detector 5 is minimized, contrary to the foregoing case (f1−f2=fB). Therefore, in such a case, the optical frequency controlling device 7-1 is controlled so that the signal level detected by the photo detector 5 is minimized. In this case, a negative value is selected as the foregoing proportionality factor A.

Figure 7:
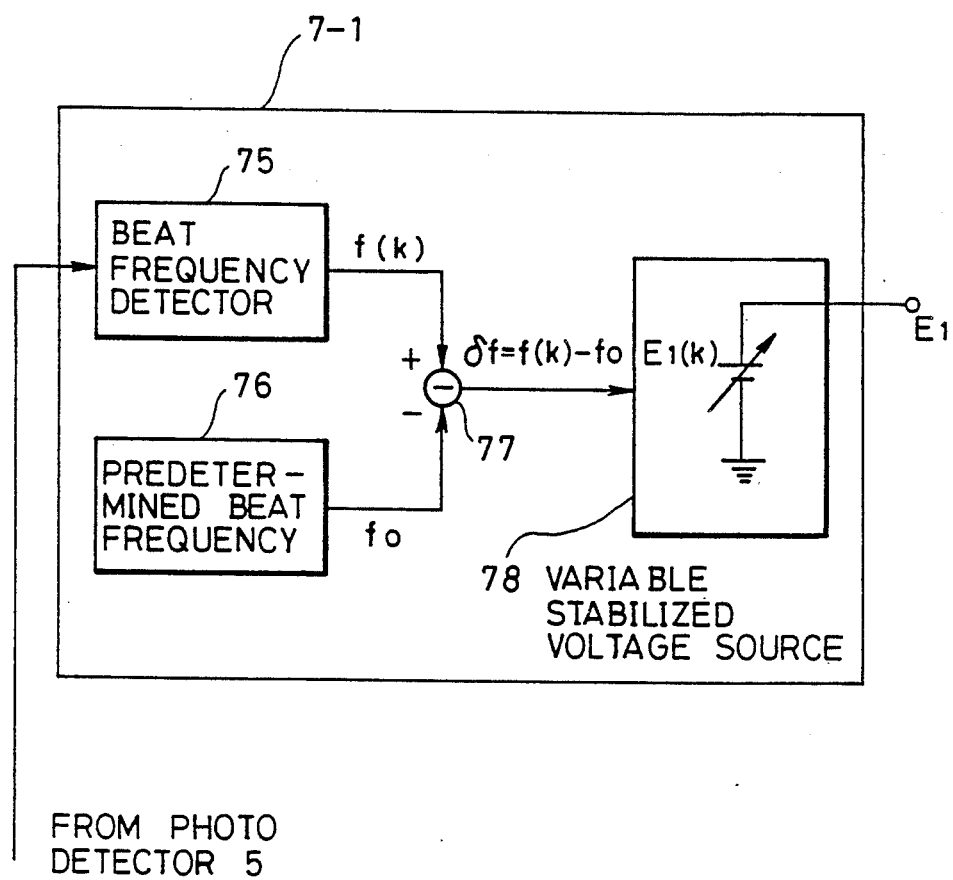

FIG. 7 shows a specific embodiment of the optical frequency controlling unit 7-1 for adjusting the frequency of the beat component of the output from the photo detector 5 to a predetermined value.

As seen from the arrangement shown in FIG. 1, the Rayleigh scattered light due to a pulsed light emitted from the first light source 1 is detected by the photo detector 5 together with the probe light emitted from the second light source 2. At this time, a beat signal is generated in the photo detector 5, whose frequency is equal to the frequency difference between the first and second light sources 1 and 2.

Then, in the arrangement shown in FIG. 7, the output signal from the photo detector 5 is supplied to a beat frequency detector 75 to detect the beat frequency f(k) at time t(k). Reference numeral 76 denotes a reference beat frequency generator which provides a reference beat frequency of. The beat frequency f(k) and the reference beat frequency fo are supplied to a subtractor 77 to obtain a frequency difference δf=f(k)−fo. The frequency difference δf is supplied to a variable stabilized power supply 78 to generate an output voltage E1(k)=E1(k−1)+A'δf. This output voltage E1(k) is applied to the first light source 1 so that the first light source 1 is controlled to satisfy a condition of: δf=0 (wherein A' is a constant for feedback).

While the present invention has been explained with reference to the voltage-control type optical frequency controlling units 7-1 and 7-2, they may be arranged as a current-control type. In this case, the operations thereof are substantially identical with those of the voltage-control type, except the circuit arrangement.

Embodiment 3

Figure 8:
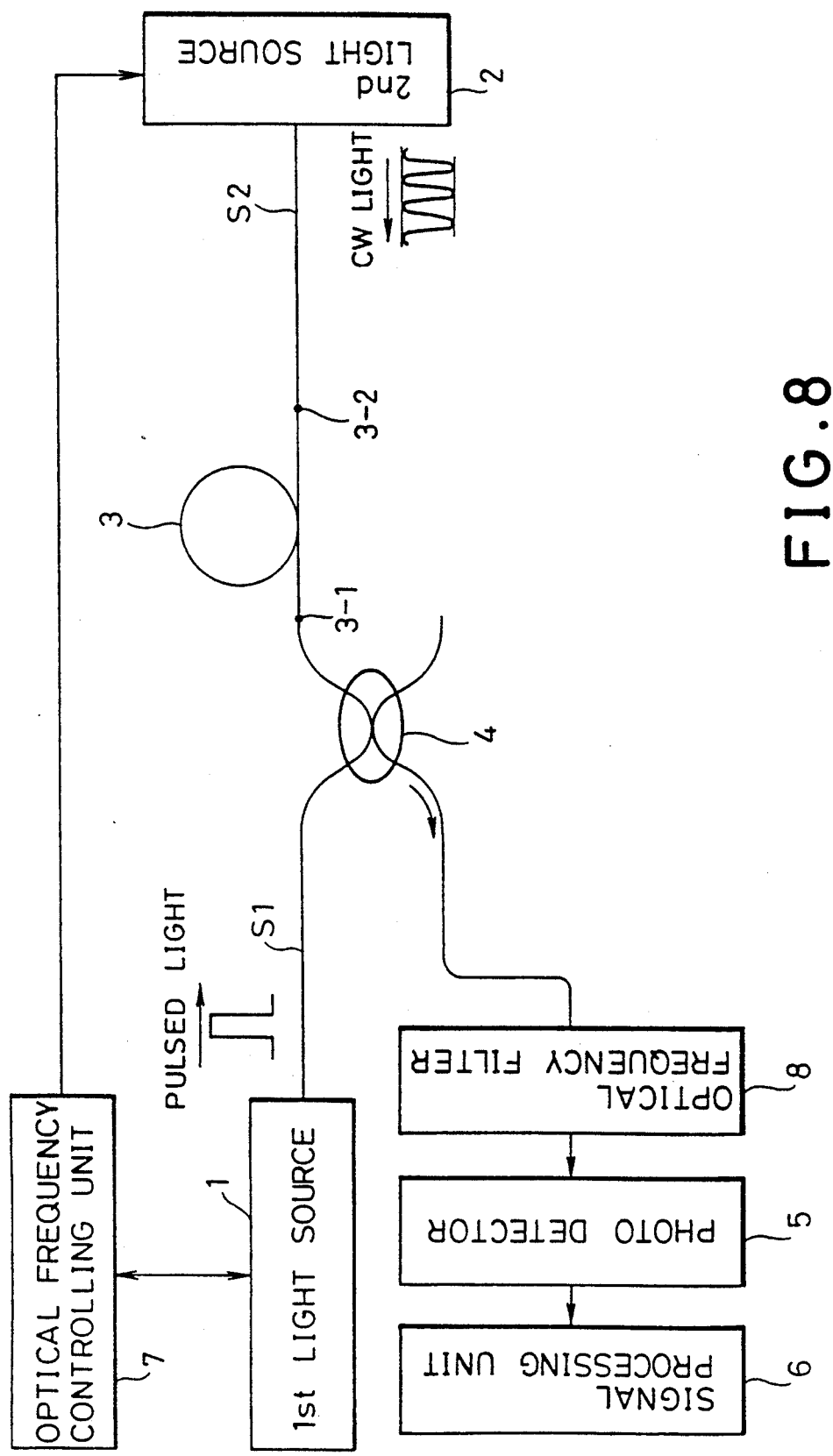
FIG. 8 is a schematic diagram showing an arrangement of Embodiment 3 according to the present invention.

FIG. 8 shows Embodiment 3 of the present invention which is identical with Embodiment 1 of the present invention as shown in FIG. 1 except that an optical frequency filter 8 is disposed at the front stage of the photo detector 5. The optical frequency filter 8 passes the second signal light S2 of frequency f2, but shuts off the first signal light S1 of frequency f1. The operations of this Embodiment 3 are almost identical to Embodiment 1. Thus, the following effects are achieved: (1) The filter 8 prevents the incidence of the Rayleigh back-scattered light (which is measured by the conventional OTDR) generated while the first signal light S1 propagates along the optical fiber 3 to be measured into the photo detector 5 and thus prevents the scattered light from being a noise against the signal light S2. (2) The filter 8 prevents the strong Fresnel reflection of the first signal light S1 reflected at the incident end or the emitting end of the optical fiber 3 to be measured or at the connector points in the optical fiber 3 from entering the photo detector 5. Usually, when an extremely strong signal is detected, any weak signals immediately after the strong signal cannot be detected because of the trailing or the overshoot behavior for the strong signal due to saturation of the detection system. This results in the problem of a dead zone. However, according to Embodiment 3 of this invention, the problem of such a dead zone associated with the conventional OTDR can effectively be solved by the insertion of the filter 8.

Embodiment 4

Figure 9:
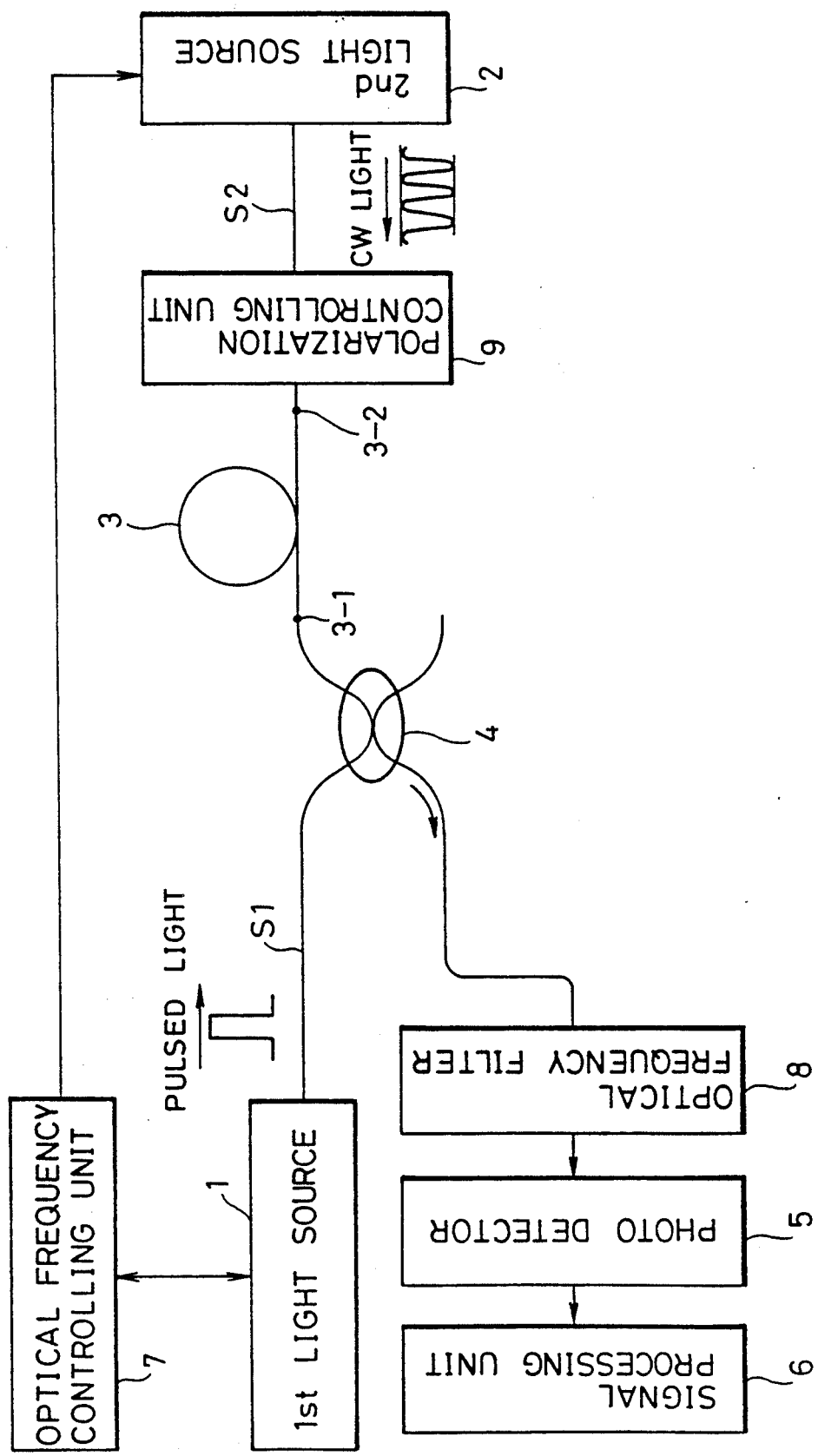
FIG. 9 is a schematic diagram showing an arrangement of Embodiment 4 according to the present invention.

FIG. 9 shows Embodiment 4 of this invention. In FIG. 9, reference numeral 9 denotes a polarization controlling device which controls the polarization state of the second signal light S2. The device 9 is disposed between the second light source 2 and the optical fiber 3 to be measured. In Embodiments 1 and 2 shown in FIGS. 1 and 3, respectively, it is tacitly assumed that the relation between the polarization states of the first and second light sources 1 and 2 is constant throughout the optical fiber 3 to be measured. However, such a condition is satisfied only in a special optical fiber such as polarization-maintaining optical fiber or a multi-mode optical fiber in which the polarization state is randomized. On the other hand, the gain g due to the Brillouin light amplification exhibits a polarization dependence such that it has a maximum value when the polarization directions of the signal lights S1 and S2 coincide with one another and such that it becomes unity when they are perpendicular to one another. Therefore, when such a measurement is performed on a typical single mode optical fiber, the polarization controlling device 9 as shown in FIG. 9 needs to be arranged. The gain g can easily be obtained and expressed by the following equation:

$$g = 1 + 0.5 G_{max} [1 + B \cos(2\theta + \phi)] \quad (6)$$

Here, 1+G max represents the maximum gain obtained when the polarization directions of the signal lights S1 and S2 coincide with one another. B and φ are amounts depending on z and B fulfills the relation: −1≦B≦1. θ represents the polarization direction of the second signal light S2 when it enters the optical fiber 3 to be measured.

Figure 10A:
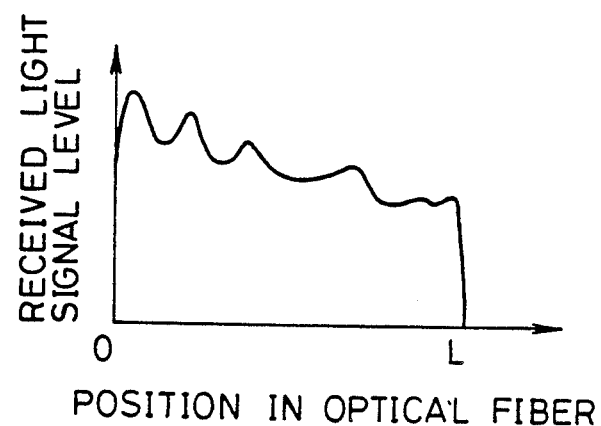
FIGS. 10A-10C are explanatory diagrams for explaining the polarization effect on waveforms to be measured.
Figure 10B:
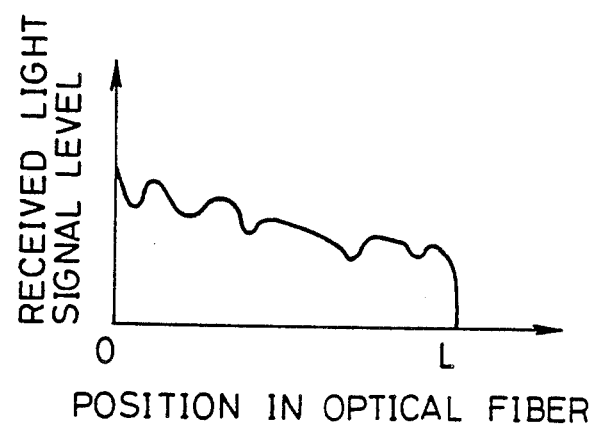
Figure 10C:
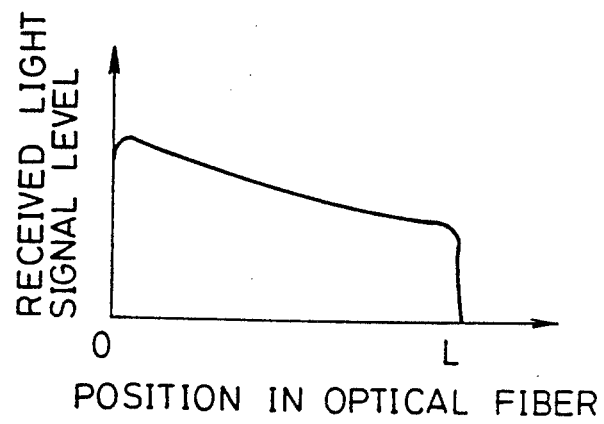

Typical optical fibers have a slight modal birefringency. Therefore, the polarization state of a signal light propagating through the fiber varies depending on the position z. Thus, the signal waveforms obtained when the typical optical fiber is examined by the measurement systems of Embodiment 1 or 3 shown in FIG. 1 or 8, are not as shown in FIG. 2 in practice, fluctuate as shown in FIG. 10A. In FIGS. 10A to 10C, DC components are omitted. Moreover, the abscissa axis expresses time in terms of a position in the optical fiber in accordance with equation (5). This fluctuation reflects the polarization state of the signal lights S1 and S2 at each position z in the optical fiber 3.

The polarization controlling device 9 can be formed by, for instance, a polarizer for converting the second signal light S2 from the light source 2 into a linearly polarized light and a half wave plate. In this case the second signal light S2 can be made incident upon the optical fiber 3 in any polarization direction, by rotating the half wave plate. FIG. 10A shows a waveform obtained when the second signal light S2 is linearly polarized in a direction $\theta$ and is made incident upon the optical fiber 3 to be measured in the measuring system shown in FIG. 9. FIG. 10B shows a waveform obtained when the second signal light S2 is linearly polarized in the direction $(\theta + \pi/2)$, which is perpendicular to the direction $\theta$, and is made incident upon the optical fiber 3 to be measured.

As seen from equation (6), in FIGS. 10A and 10B the polarities of the fluctuations are reversed. Therefore, if the signal levels shown in FIG. 10A and 10B are averaged by signal processing unit 6 an output waveform having a level as shown in FIG. 10C is obtained. It is found that fluctuation is eliminated in the waveform shown in FIG. 10C and that a smooth waveform which reflects the optical loss of the optical fiber 3 to be examined is obtained like in the case shown in FIG. 2. Moreover, it was confirmed by experiments that the signal level was about 100 times higher than that obtained by the conventional OTDR.

In the foregoing explanation, in order to obtain the wave forms shown in FIG. 10A and 10B, the measurement is performed twice in total by rotating the half wave plate which constitutes the polarization controlling device 9 to change the polarization state of the second signal light S2. Alternatively, the waveform shown in FIG. 10C can directly be obtained by rapidly changing the polarization state of the second signal light S2.

To this end, it is sufficient to use a polarization controlling device 9 for changing the polarization state of the second signal light S2, which is composed of an optical fiber (preferably, an optical fiber such as polarization-maintaining optical fiber which has a large mode birefringence) wound around a piezoelectric device such as PZT and which experiences periodic or random elongation and side pressure strain.

Alternatively, electro-optical effect type elements such as LiNbO3 are also preferable as a fast polarization controlling device 9.

In additional in the above explanation, the polarization controlling device 9 is disposed between the optical fiber 3 to be measured and the second light source 2 to change the polarization state of the second signal light S2. However, the same effect can of course be expected by changing the polarization state of the first signal light S1.

Thus, the polarization controlling device 9 may be disposed between the first light source 1 and the optical multi-demultiplexer 4 or between the optical multi-demultiplexer 4 and the optical fiber 3 to be measured. Alternatively, the polarization controlling device 9 may be disposed in the middle of the optical fiber 3 to be measured so that the polarized states of both signal lights S1 and S2 can be changed.

Embodiment 5

Embodiment 5 is an embodiment of the method of this invention for determining the distribution of the relative refractive index difference between the core and cladding of an optical fiber along its longitudinal direction. The Brillouin frequency shift fB varies according to the material of an optical fiber. For instance, silica optical fibers have an fB of about 13 GHz at a wavelength of 1.3 $\mu$m. In optical fibers whose cores are doped with GeO2, their fB decreases by 120 MHz per 0.1% increase of relative refractive index difference between the core and cladding.

Figure 11:
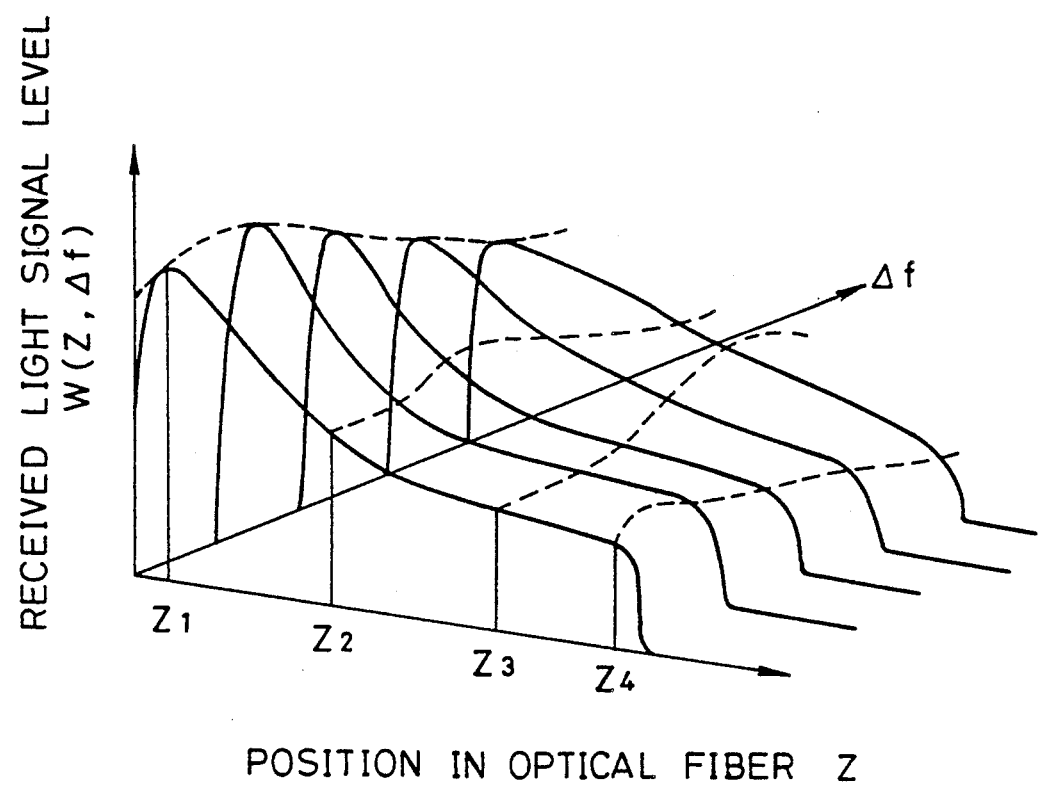
FIG. 11 is a waveform diagram illustrating an example of waveforms observed when the optical frequency difference $\Delta f$ between the first and second signal lights are varied.

Therefore, the distribution of the relative refractive index difference between the core and cladding in the longitudinal direction of the optical fiber can be determined by measuring, as a function of each position z, the difference between the optical frequencies of the first signal light S1 and the second signal light S2, $(\overline{\Delta f} = f1 - f2)$ when the received light signal level obtained by using the measurement system of the present invention shown in FIG. 1, FIG. 8 or FIG. 9 reaches its maximum value More specifically, measurements are performed while repeatedly changing the difference between the optical frequencies of the first signal light S1 and second signal light S2, $(\Delta f = f1 - f2)$ by the optical frequency controlling unit 7, and the resultant various measured waveforms W(z, $\Delta f$) are stored with the help of the signal processing unit 6 in a memory 64 disposed in the signal processing unit 6 as shown in FIG. 11.

In FIG. 11, broken lines show the $\Delta f$-dependency of the received light signal W at positions z1, z2, z3 and z4. As seen from FIG. 11, this clearly shows that the values of $\overline{\Delta f}$ which provide maximum values of W vary according to position z (such a value is defined to be "$\overline{\Delta f}$"). Thus, waveform analysis is performed based on the data stored in the memory 64 of the signal processing unit 6, and the optical frequency difference $\overline{\Delta f}$ between the first signal light S1 and the second signal light S2, which provides a maximum value of W at each position z, is thus obtained.

Figure 12:
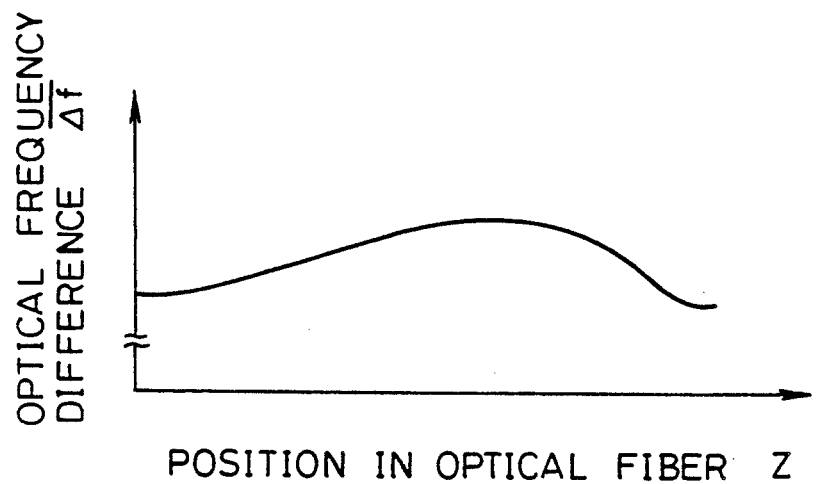
FIG. 12 is a characteristic graph illustrating the relationship between a position z in an optical fiber and the optical frequency difference $\overline{\Delta f}$ between the first and second signal lights (corresponding to the relative refractive index difference between the core and cladding of the optical fiber) at which the maximum optical signal level is obtained.

The value $\overline{\Delta f}$ thus obtained is schematically shown in FIG. 12. The longitudinal direction-dependency of the relative refractive index difference between the core and cladding can be obtained from the aforementioned relation between the value fB and the relative refractive index difference between the core and cladding.

A method for measuring the distribution of the core diameter in the longitudinal direction of the optical fiber to be measured, according to the present invention, will now be explained. If the spectral linewidths $\Delta f1$ and $\Delta f2$ of the first light source 1 and the second light source 2 are identical with or narrower than the Brillouin light amplification bandwidth, $\Delta fB$, of the optical fiber 3 to be measured, the waveform W(z, $\Delta f$) measured according to the present invention substantially depends on the optical frequency difference between the first signal light S1 and the second signal light S2, $(\Delta f = f1 - f2)$ corresponding to the distribution of the relative refractive index difference between the core and cladding in the longitudinal direction of the optical fiber 3 as is shown in FIG. 11. Thus, in order to determine the distribution of the core diameter in its longitudinal direction, it is necessary to eliminate the influence on the waveform W of the distribution of the relative refractive index difference between the core and cladding in the longitudinal direction. For that purpose, it is sufficient to use the first light source 1 or the second light source 2 whose spectral linewidth is wider than the Brillouin light amplification bandwidth $\Delta fB$ of the optical fiber 3 to be measured. The waveform $\overline{W(z)}$ thus obtained is averaged with respect to $\Delta f$ and thus does not depend upon the distribution of the relative refractive index difference between the core and cladding of the optical fiber in its longitudinal direction. Moreover, the waveform $\overline{W(z)}$ may alternatively be obtained by calculating the average value of the measured waveform W(z, $\Delta f$) while changing the value of $\Delta f$, i.e., $$\overline{W(z)} = \int W(z, \Delta f) \, d(\Delta f) / \int d(\Delta f) \quad (7)$$

using the signal processing unit 6, instead of using the first light source 1 and/or the second light source 2 having such a wide spectral linewidth.

Figure 13:
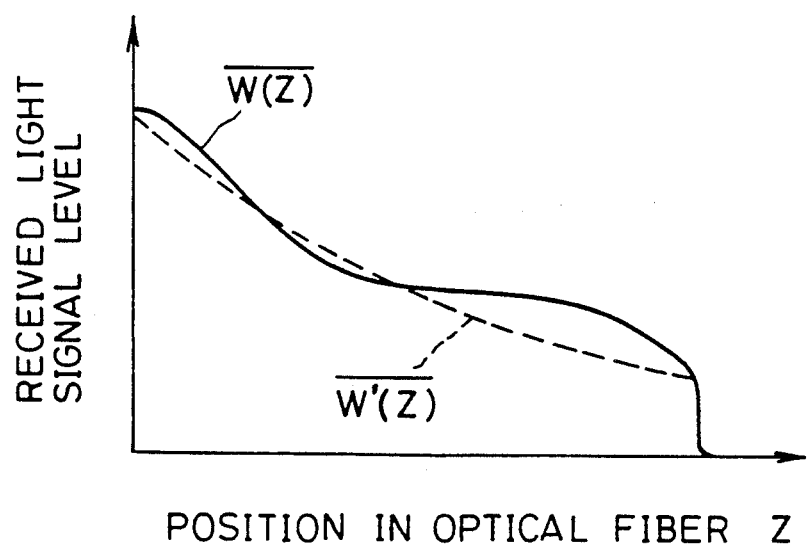
FIG. 13 is a characteristic graph illustrating a measured waveform $\overline{W(z)}$ and its optimum approximation curve $\overline{W'(z)}$ in an optical fiber where the core diameter varies along the longitudinal direction.

On the other hand, in the measurement system shown in FIG. 9, measurements can be performed without being influenced by the polarization state of the signal light as already explained above. The signal gain due to the Brillouin light amplification at this time is given by $$g = 1 + 0.5 \, G_{max} \quad (8)$$

from equation (6). Strictly speaking, Gmax is a function of the relative refractive index difference between the core and cladding and the core diameter of the optical fiber, but it can in general be assumed that it depends on only the core diameter and thus Gmax is in inverse proportion to the square of the core diameter. Therefore, it is assumed that the optical loss of the optical fiber 3 to be measured in its longitudinal direction is uniform, the normalized waveform difference, $\{\overline{W'(z)} - \overline{W(z)}\}/\overline{W'(z)}$, represents the distribution of the core diameter, $2\delta a(z)/\overline{a}$, in the longitudinal direction of the fiber, wherein $\overline{W(z)}$ is the waveform shown in FIG. 13 as solid line, measured by the measurement system shown in FIG. 9 according to the foregoing procedures, and $\overline{W'(z)}$ is the waveform shown in FIG. 13 as a dotted line, which is the least-square-approximated exponential function representing the loss of the optical fiber obtained from the waveform $\overline{W(z)}$ and $\delta a(z)$ is the variation in the core diameter and $\overline{a}$ represents the average value of the core diameter.

In the foregoing explanation, the core diameter distribution in the longitudinal direction of the fiber is determined based on $\overline{W(z)}$, but the core diameter distribution in the longitudinal direction may be obtained by compensating for the influence of the relative refractive index difference distribution in the longitudinal direction on the measured waveform $W(z, \Delta f)$, if the relative refractive index difference distribution in the longitudinal direction is known, as a matter of course.

Figure 14A:
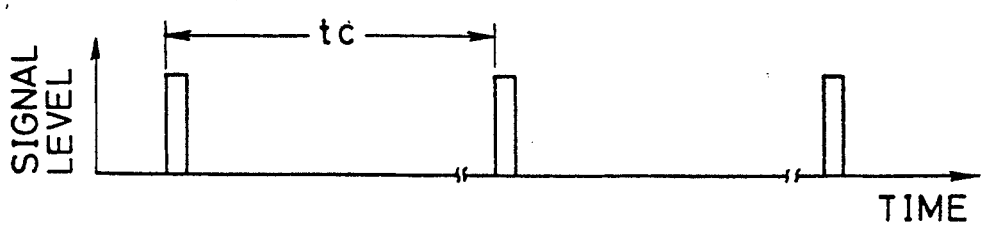
FIGS. 14A-14F are waveform diagrams showing various modulation waveforms of the first signal light.

In the foregoing explanation, it is assumed that the intensity of the first signal light S1 is modulated in the form of pulses, but the first signal light S1 may be a single pulse or repetitive pulses having a period of tc, as shown in FIG. 14A. In such a case, the signal to noise ratio can be improved by an averaging-process by the signal processing unit 6 and thus more precise measurements can be carried out.

Figure 14B:
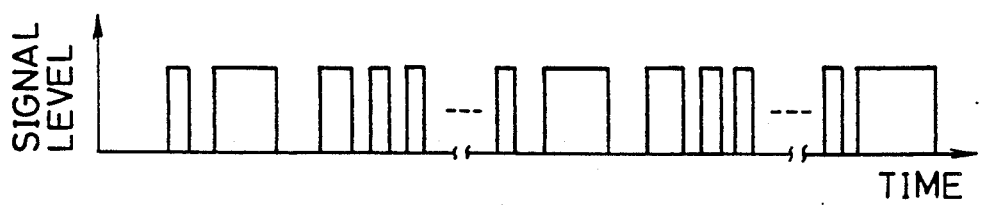

Furthermore, the first signal light S1 may be modulated by a pseudo random code (such as M series code) as shown in FIG. 14B. In this case, if the detected second signal light S2 is subjected to a correlation processing by the signal processing unit 6 on the basis of the principle of the correlation technique, the signal to noise ratio is highly improved in proportion to the length of the code when compared with the case shown in FIG. 14A (see, for instance, K. Okada et al., "Optical cable fault location using correlation technique", Electron. Lett., vol. 16, p. 629, 1980). In the conventional OTDR, if weak back-scattered light and strong Fresnel reflection light coexist, the problem of linearity of the measurement system arises and, therefore, it is impossible to use a sufficiently large code length. In contrast, a strong signal such as Fresnel reflection light can be eliminated by the use of the optical frequency filter 8 in the present invention as already explained above and thus we can make the best use of the correlation technique.

Figure 14C:
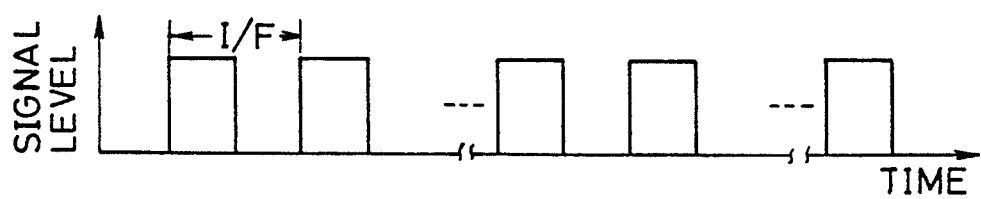

Moreover, the same measurement as that in the time-domain explained above can be performed in the frequency-domain as follows. That is, the first signal light S1 can be amplitude-modulated by a frequency F and by changing the frequency F, and frequency characteristics of the amplitude and the phase of the second signal light S2 is obtained, as shown in FIG. 14C. In this case, the problem of linearity in the detection system does not arise and highly precise measurements can be performed for the same reasons as in the correlation technique.

Figure 14D:
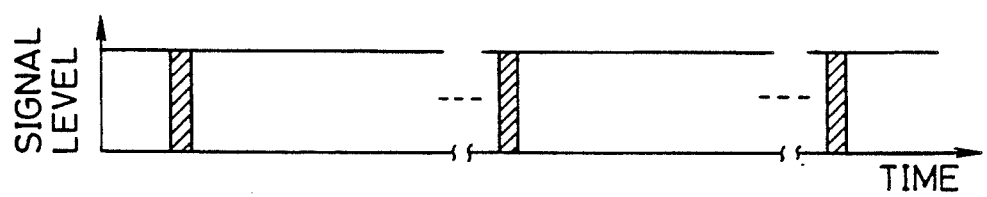
Figure 14E:
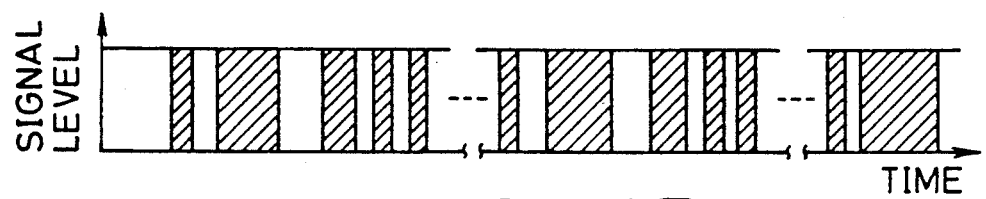
Figure 14F:
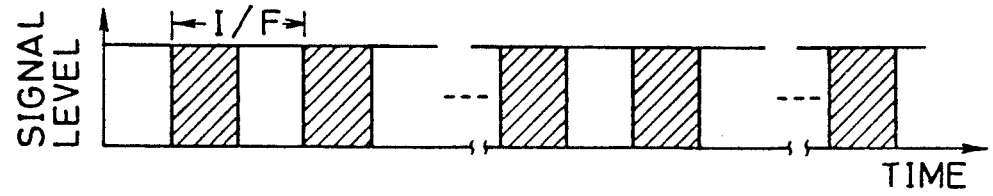

In the foregoing explanation, the first signal light S1 has been explained to be the amplitude-modulated light in every case, but it is also possible to use frequency-modulated light as the first signal light as shown in FIGS. 14D, 14E and 14F, which correspond to FIGS. 14A, 14B and 14C respectively.

In FIGS. 14D–14F, it is assumed that the frequency f1 of the first signal light S1 in the hatched portion is controlled by the optical frequency controlling unit 7 so that $|f1 - f2 - fB|$ falls within the Brillouin light amplification bandwidth $\Delta fs$ of the optical fiber 3 to be measured. Moreover, it is also assumed that the frequency f1' of the first signal light S1 in the portions other than the hatched portions does not satisfy the foregoing relation.

When the frequency is f1 (hatched portions), the conditions do not change from those in the amplitude-modulation. Accordingly, the first signal light S1 causes the Brillouin light amplification of the second signal light S2, like the previous case. On the other hand, when the frequency of the first signal light S1 is f1' (the portions other than the hatched portions), although the first signal light S1 propagates through the optical fiber 3 to be measured, the same result as in the case of a space state, in the intensity-modulation in which the first signal light S1 is absent, is obtained and thus the Brillouin light amplification does not occur since the signal light S1 and the signal light S2 do not satisfy the requirements for the Brillouin light amplification. That is, the result obtained by intensity-modulation is identical with that obtained by frequency-modulation. An advantage attained by frequency-modulation is that easy and fast modulation can be performed by slightly changing the injection current without using an external modulator when a semiconductor laser such as a DFB laser or a DBR laser is used as the light source.

In the case of a silica optical fiber, $\Delta fB$ is about 100 MHz. Therefore, it is sufficient to select the foregoing frequency f1' so as to fulfill the requirement: $|f1' - f1| > 100$ MHz. In this case, the injection current change of the semiconductor laser can be small, on the order of about 0.1 mA.

The present invention has been explained with particular examples concerning the measurements of the distributions of optical loss, the relative refractive index difference between the core and cladding and the core diameter of an optical fiber in its longitudinal direction. However, it is also known that the Brillouin frequency shift fB is dependent upon the change in stress applied to the optical fiber and the change in temperature of the optical fiber.

Figure 15:
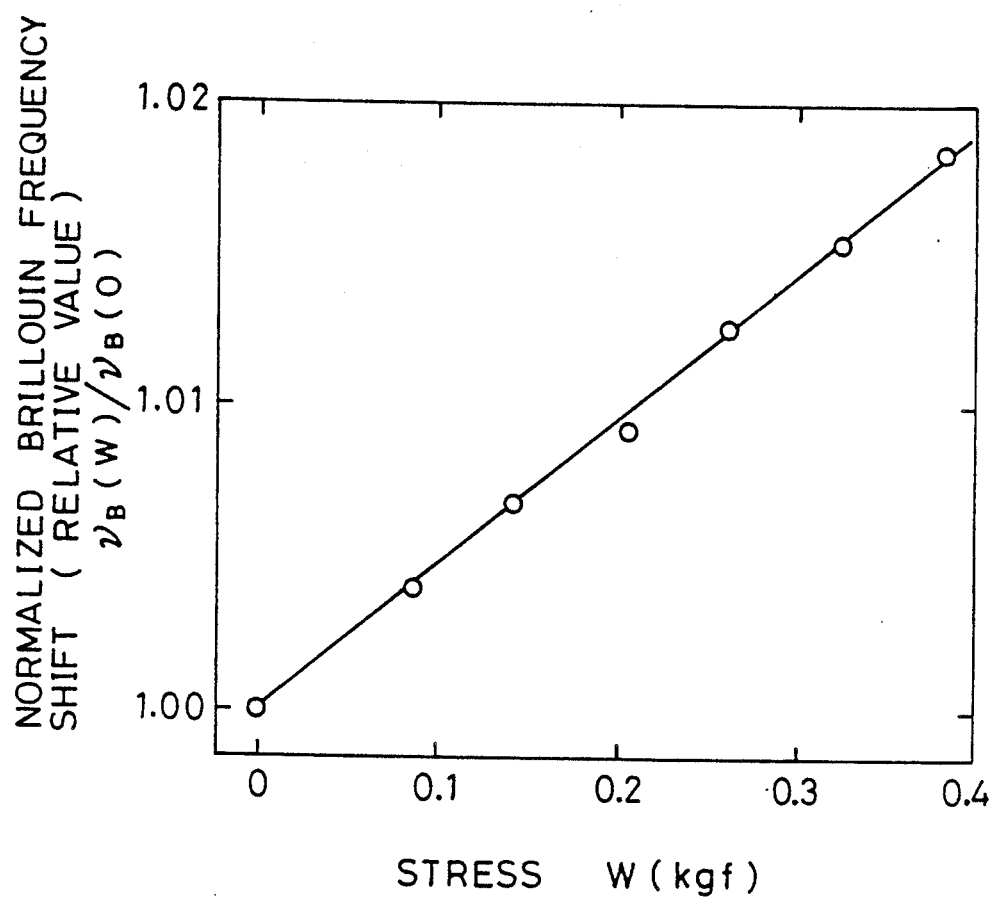
FIG. 15 is a characteristic graph illustrating the stress dependence of Brillouin frequency shift.

FIG. 15 is a graph showing an example of experimental results on the relation between the stress applied to the optical fiber and the Brillouin frequency shift. As seen from FIG. 15, the stress is proportional to the Brillouin frequency shift change. The proportionality factor depends on the material of the optical fiber, but the factors for silica optical fibers are approximately constant irrespective of the kind of dopant and the amount thereof. Therefore, it is possible to measure the changes in stress applied to the optical fiber along the longitudinal direction of the fiber and changes in temperature of the optical fiber along the longitudinal direction of the fiber by measuring the amount of change in the Brillouin frequency shift fB wherein the received light level of the second signal light S2 becomes maximum. As is clear from the foregoing explanation, the amount of change in the Brillouin frequency shift fB can be measured from the amount of change in the frequencies of the signal lights S1 and S2 of the first light source 1 and the second light source 2 which are changed so that the received level of the second signal light S2 becomes maximum.

It is to be understood that changes and modifications can be made to the preferred embodiments described above, to which the present invention is not limited, without departing from the true spirit of the present invention defined by the appended claims.

For instance, in the embodiment of the present invention shown in FIG., 1, 8 or 9, the apparatus is equipped with a branch type optical multi-demultiplexer 4, but this can be replaced by a Mach Zehnder interferometer 10 shown in FIG. 16 as will be described below.

Figure 16:
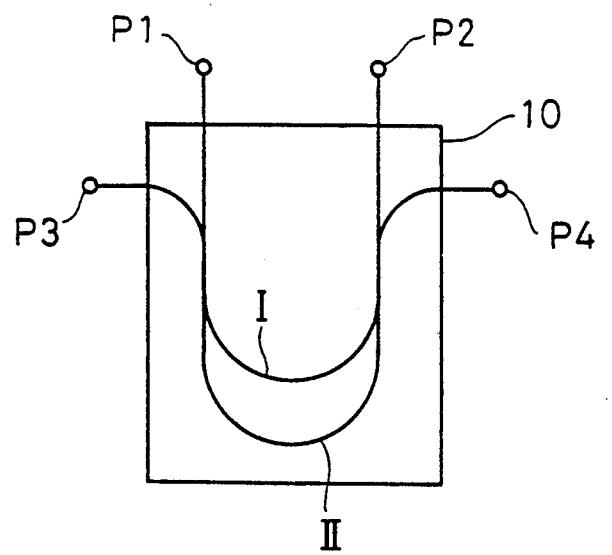
FIG. 16 is a schematic diagram showing an example of the construction of a Mach-Zehnder interferometer.
Figure 17A:
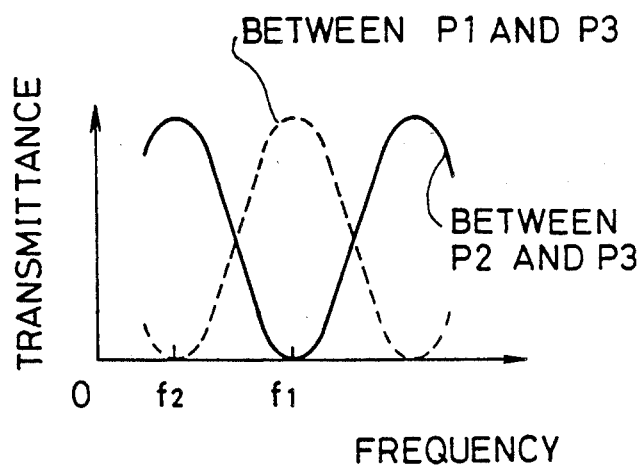
FIGS. 17A and 17B are characteristics graphs showing the transmission characteristics of Mach-Zehnder interferometer.

In FIG. 16, the Mach Zehnder interferometer 10 has, for instance, a port P1 connected to the first light source 1, a port P3 connected to the photo detector 5 and a port P2 connected to a terminal followed by the optical fiber 3 to be measured. In this case, the port P4 is not used. Since the interferometer 10 has the transmission characteristics as shown in FIG. 17A, the first signal light S1 (having frequency f1) arrives at the optical fiber 3 to be measured without any transmission loss in the interferometer 10 (between the ports P1 and P2) while the second signal light S2 (having frequency f2) is also made incident upon the photo detector 5 without any transmission loss in the interferometer 10 (between the ports P2 and P3). This leads to a substantial reduction in the insertion loss compared with those observed when branch type optical multi-demultiplexers 4 shown in FIGS. 1, 8 and 9 are used.

In this case, the Fresnel reflection light and the Rayleigh back-scattered light due to the first signal light S1 having a frequency of f1 do not enter the photo detector 5, even if the optical frequency filter 8 is not used, and thus only the second signal light S2 having a frequency f2 is detected.

Figure 17B:
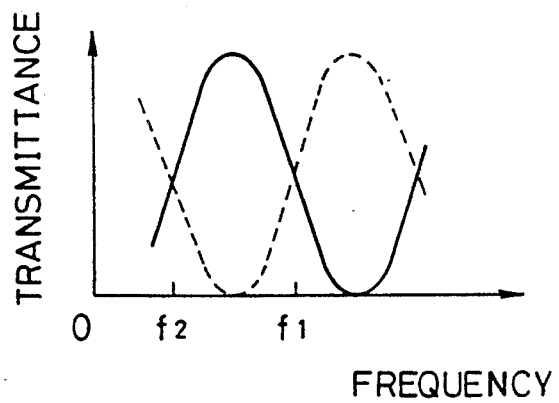

Moreover, the characteristics of the interferometer 10 can be switched from the state shown in FIG. 17A to the state shown in FIG. 17B, when the optical path difference between the optical paths I and II of the interferometer 10 is varied by, for instance, applying a thermal stress to one of the optical paths. In this case, the interferometer 10 may be deemed to be equivalent to a 3 dB branch type optical multi-demultiplexer, with respect to the first signal light S1 having a frequency of f1.

Alternatively, in FIG. 17A, the same effect can be obtained even by converting the frequency f1 of the first signal light S1 to, for instance, (f1+f2)/2. In this case, if the second light source 2 is not used, the apparatus for evaluating properties of an optical fiber according to the present invention can be changed to a conventional OTDR for measuring the Rayleigh back-scattered light.

Figure 18:
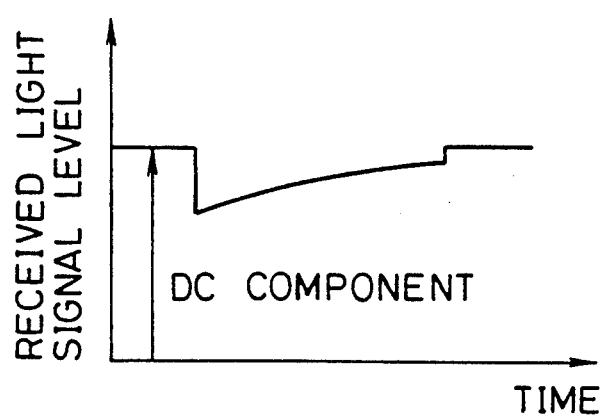
FIG. 18 is a waveform diagram showing an example of the waveform which is measured according to the present invention.

In all the embodiments of the present invention explained above, it has been assumed that the optical frequency f1 of the first signal light S1 at the time of mark satisfies the relation expressed by equation (b 1). However, even if the second signal light S2 is substituted for the first signal light S1 and the latter is Brillouin-light-amplified by the second signal light S2, i.e., $$f2 - f1 = fB \quad (9),$$

all the measurements of the present invention explained above can likewise be performed. In this case, the second signal light S2 loses its light power through the Brillouin light amplification of the first signal light S1 and, therefore, the waveform of the second signal light S2 detected by the photo detector 5 shows a form depressed from the DC component as shown in FIG. 18.

In the foregoing explanation, it has been assumed that the power of the first signal light S1 is not changed even if there is a non-linear interaction, i.e., the Brillouin light amplification between the first and second signal lights S1 and S2. However, when the gain of the Brillouin light amplification is large, the change in the power of the first signal light S1 is not negligible and in turn the properties of the optical fiber such as optical loss cannot be correctly evaluated from the measured signal waveform.

When the condition of equation (1) is established, the second signal light S2 is amplified, while the power of the first signal light S1 is reduced. By a simple analysis, the second term on the right side of equation (4) is expressed by the following relation:

$$WA(z) = A \cdot P1(O) \cdot P2(L) \cdot \exp(-\alpha L) \cdot \exp(-\alpha z) \cdot \exp(-Q(z)) \quad (10)$$

The term $\exp(-Q(z))$ represents the effect due to the reduction in the power of the first signal light S1 and this leads to errors in the measurement of the loss in the optical fiber. On the other hand, if the requirement represented by equation (9) is established, the power of the first signal light S1 increases and thus the second term in the right side of equation (4) is expressed by $$WB(z) = A \cdot P1(O) \cdot P2(L) \cdot \exp(-\alpha L) \cdot \exp(-\alpha z) \cdot \exp(Q(z)) \quad (11)$$

In this way, it is impossible to correctly evaluate the loss in the optical fiber from only one measurement of WA(z) or WB(z).

However, as seen from equations (10) and (11), a highly precise measurement can be executed by measuring two waveforms i.e., WA(z) and WB(z), since the term Q(z) can be eliminated by calculating $\{WA(z) + WB(z)\}/2$ when $Q(z) << 1$ or $WA(z) \cdot WB(z)$ when $Q(z) > 1$.

Thus, by comparing and analyzing the two results obtained by replacing the pump and probe lights for Brillouin light amplification, more precise evaluation of the characteristics can be performed.

In all the embodiments of the present invention explained above, it is assumed that the second light source 2 emits CW light, but the second light source 2 may be a modulated light source like the first light source 1. In such a case, the Brillouin light amplification takes place only at a position (for instance, zo) where the first signal light S1 (e.g., a light pulse) emitted from the first light source 1 encounters with the second signal light S2 (e.g., a light pulse) emitted from the second light source 2. Therefore, this method is quite suitable for obtaining information such as change in the optical loss in an optical fiber, temperature change, stress change and so on at a particular point (the foregoing point zo) in the optical fiber 3. The point zo may be selected at any desired point by controlling the relative time interval between the emission of the first signal light S1 and that of the second signal light S2.

As explained above, according to the present invention, the characteristics of an optical fiber to be measured can be evaluated by making use of the Brillouin light amplification effect between the modulated signal light propagating through the optical fiber, i.e., the first signal light and the second signal light which propagates in the fiber in the direction opposite to the first signal light and by analyzing the change in the waveform of the second signal light resulting from the Brillouin light amplification effect therebetween. In this respect, the signal level of the change in the waveform is 100 times or more larger than that obtained in the conventional OTDR, and the attenuation rate of the signal level obtained according to the present invention in proportion to the length of the optical fiber (in other words, fiber loss) is $\frac{1}{2}$ time that of the conventional OTDR. Therefore, the following advantages can be attained according to the present invention:

(1) Even if a light source of low power such as a semiconductor laser is used, there can be provided an apparatus for evaluating the properties of an optical fiber, which can provide a signal to noise ratio that is relatively high compared with the conventional OTDR and which can achieve highly precise measurements.

(2) Since the frequency of the first signal light differs from that of the second signal light, it is possible to prevent strong Fresnel reflection light due to the first signal light from being incident upon the photo detector by using an optical frequency filter.

(3) To date, the measurement at a point immediately after a connector junction at which a strong Fresnel reflection pulse is generated has been impossible and thus a region where such measurement is impossible (i.e., dead zone) is formed. However, such a dead zone can be eliminated in accordance with the present invention and thus a measurement can be made at a point immediately after the connector junction.

(4) The problem of linearity of the detection system does not arise The correlation processing or the measurement in a frequency region are easily performed and thus the signal to noise ratio can substantially be improved.

(5) Moreover, the amount of change in the waveform of the second signal light which is measured according to the present invention depends on the optical frequency difference between the first signal light and the second signal light and becomes maximum when the difference coincides with the Brillouin frequency shift which is determined by the kinds of materials of the optical fiber and the relative refractive index difference between the core and cladding of the optical fiber.

Thus, the distribution of the relative refractive index difference between the core and cladding in the longitudinal direction of the optical fiber can be measured by performing measurements while changing the optical frequency difference between the first signal light and the second signal light. In this respect, the conventional OTDR technique cannot separately determine the distribution of the relative refractive index difference between the core and cladding and that of the core diameter, but such measurements can be performed according to the present invention.

(6) Since the amount of change in the waveform of the second signal light measured according to the present invention varies depending upon the optical loss in the optical fiber, its core diameter as well as the stress applied to the fiber, its temperature and so on, the amounts of physical properties such as optical loss, core diameter, stress and temperature in the longitudinal direction of the optical fiber, can be determined according to the invention.

As seen from the foregoing description, the present invention can effectively be applied not only to evaluation of the characteristics of an optical fiber when manufacturing optical fibers but also to distributed remote measurements in which variations in the stress applied to the fiber and the temperature change thereof are utilized.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for evaluating properties of an optical fiber, comprising the steps of:
    making incident a first signal light in the form of modulated light from a first light source upon an optical fiber to be measured;
    propagating a second signal light from a second light source in said optical fiber to be measured in the direction opposite to that of the first signal light;
    controlling the frequency of at least one of said first and second light sources;
    setting the frequency difference $\Delta f$ between said first signal light and said second signal light at a predetermined value;
    producing an optical nonlinear interaction between said first signal light and said second signal light;
    detecting said second signal light after it undergoes said optical nonlinear interaction;
    determining the time dependent signal power W of the detected second signal light; and
    evaluating the properties of said optical fiber to be measured on the basis of said time dependent signal power W,
    wherein said optical nonlinear interaction is Brillouin light amplification, and
    wherein the loss $\alpha$ (dB/km) of a given section $<a, b>$ of said optical fiber is evaluated from the equation $$\alpha = 1000 \times 10 \log_{10} (W_a/W_b)/(vt_{ab}/2) \ (dB/km).$$

where v represents the velocity of light in said optical fiber (m/s), Wa and Wb represent the detected time-dependent signal power of said second signal light at the respective ends a and b of said section of said optical fiber to be measured, and $t_{ab}$ represents the time required for the first or second signal light to go back and forth between said section $<a, b>$.

2. A method for evaluating properties of an optical fiber as claimed in claim 1, wherein the oscillation linewidth of at least one of said first and second light sources is wider than the bandwidth of Brillouin light amplification of said optical fiber to be measured.

3. A method for evaluating properties of an optical fiber as claimed in claim 1, wherein the step of determining said time dependent signal power W of said second signal light is accomplished by calculating in accordance with the following equation:

$$\sum_{k=1}^{k=N} W_k$$

where Wk is the time dependent signal power of said second signal light which undergoes said Brillouin amplification and is detected at the instance when the frequency difference between said first signal light and said second signal light is $\Delta fk$ ($k=1, 2, \ldots, N$, N being a positive integer).

4. A method for evaluating properties of an optical fiber as claimed in claim 1, wherein the step of determining the time dependent signal power W of said second signal light comprises the steps of maintaining the polarization of one of said first signal light and said second signal light; producing time dependent signals by changing the polarization state of the other of said first signal light and said second signal light to alternatively take one of a pair of orthogonal polarization states; detecting the time dependent signal powers Ws and Wp of said time dependent signals corresponding to said orthogonal polarization states; and calculating said time dependent signal power W as the arithmetic mean expressed by (Ws+Wp)/2.

5. A method for evaluating properties of an optical fiber as claimed in claim 1, wherein the step of determining the time dependent signal power W of the detected second signal light comprises the steps of:
   assigning f1 and f2 to the respective optical frequencies of said first signal light and said second signal light so that the frequencies f1 and f2 satisfy the relationship f1−f2=fB (wherein fB is the Brillouin frequency shift);
   detecting said second signal light, which is Brillouin-light-amplified, to obtain the time dependent power WA of the detected second signal light;
   assigning f1' and f2' to the respective optical frequencies of said first signal light and said second signal light so that the frequencies f1' and f2' satisfy the relationship f2'−f1'=fB;
   detecting said second signal light which is Brillouin-light-amplified to obtain the time dependent power WB of the detected second signal light; and
   calculating the arithmetic mean (WA+WB)/2 or the geometric mean root $\sqrt{WA \times WB}$, and specifying said arithmetic mean or said geometric means as the time dependent signal power W.

6. A method for evaluating properties of an optical fiber, comprising the steps of:
   making incident a first signal light in the form of modulated light from a first light source upon an optical fiber to be measured;
   propagating a second signal light from a second light source in said optical fiber to be measured in the direction opposite to that of the first signal light;
   controlling the frequency of at least one of said first and second light source;
   setting the frequency difference $\Delta f$ between said first signal light and said second signal light at a predetermined value;
   producing an optical nonlinear interaction between said first signal light and said second signal light;
   detecting said second signal light after it undergoes said optical nonlinear interaction;
   determining the time dependent signal power W of the detected second signal light; and
   evaluating the properties of said optical fiber to be measured on the basis of said time dependent signal power W,
   wherein said optical nonlinear interaction is Brillouin light amplification, and
   wherein said step of evaluating the properties of said optical fiber includes evaluation of the relative refractive index difference distribution, temperature distribution, or stress distribution in said optical fiber to be measured from the frequency difference $\Delta f$ (where $\Delta f = fB$, the Brillouin frequency shift) that makes the amplitude of said time dependent signal power W maximum.

7. A method for evaluating properties of an optical fiber as claimed in claim 6, wherein the step of determining the time dependent signal power W of said second signal light comprises the steps of maintaining the polarization of one of said first signal light and said second signal light; producing time dependent signals by changing the polarization state of the other said first signal light and said second signal light to alternately take one of a pair of orthogonal polarization states; detecting the time dependent signal powers Ws and Wp of said time dependent signals corresponding to said orthogonal polarization states; and calculating said time dependent signal power W as the arithmetic mean expressed by (Ws+Wp)/2.

8. A method for evaluating properties of an optical fiber as claimed in claim 6, wherein the step of determining the time dependent signal power W of the detected second signal light comprises the steps of:
   assigning f1 and f2 to the respective optical frequencies of said first signal light and said second signal light so that the frequencies f1 and f2 satisfy the relationship f1−f2=fB (where fB is the Brillouin frequency shift);
   detecting said second signal light which is Brillouin-light-amplified to obtain the time dependent power WA of the detected second signal light;
   assigning f1' and f2' to the respective optical frequencies of said first signal light and said second signal light so that the frequencies f1' and f2' satisfy the relationship f2'−f1'=fB;
   detecting said second signal light which is Brillouin-light-amplified to obtain the time dependent power WB of the detected second signal light; and
   calculating the arithmetic mean (WA+WB)/2 or the geometric mean root $\sqrt{WA \times WB}$, and specifying said arithmetic mean or said geometric mean as the time dependent signal power W.

9. A system for evaluating properties of an optical fiber, comprising:
- a first light source means for emitting a first signal light in the form of modulated light;
- a second light source means for emitting a second signal light;
- an optical frequency controlling device means for controlling the optical frequency difference between said first signal light and said second signal light;
- means for launching said second signal light into an end of said optical fiber to be measured;
- an optical multi-demultiplexing means for launching said first signal light onto the other end of said optical fiber to be measured, and for extracting said second signal light at the other end of said optical fiber;
- an optical frequency filter which receives light from said multi-demultiplexing means and passes said second signal light but not said first signal light;
- a photo detecting means for converting the light passed by said optical frequency filter into an electric signal; and
- a signal processing means for processing and analyzing the time dependent waveform of said electric signal from said photo detecting means,
- wherein at least one of said first light source means and said second light source means is an optical frequency variable type longitudinal single mode oscillation laser, and
- wherein the optical frequency difference between said first signal light and said second signal light is equal to or approximately equal to the Brillouin frequency shift of said optical fiber to be measured.

10. A system for evaluating properties of an optical fiber as claimed in claim 9, further comprising means for changing the polarization state of at least one of said first signal light and said second signal light.

11. A system for evaluating properties of an optical fiber as claimed in claim 9, wherein said first signal light emitted by said first light source means is modulated by a pseudo-random modulation.

12. A system for evaluating properties of an optical fiber as claimed in claim 11, wherein said pseudo-random modulation is a binary ASK (Amplitude Shift Keying).

13. A system for evaluating properties of an optical fiber as claimed in claim 11, wherein said pseudo-random modulation is an FSK (Frequency Shift Keying), and the optical frequency difference $\Delta f$ between said first signal light and second signal light is equal to or approximately equal to the Brillouin frequency shift when said FSK takes a mark signal, and is separated from the Brillouin frequency shift by more than the Brillouin gain bandwidth in the optical fiber to be measured when said FSK takes a space signal.

14. A system for evaluating properties of an optical fiber as claimed in claim 13, wherein said FSK is binary.

15. A system for evaluating properties of an optical fiber as claimed in claim 9, wherein the oscillation linewidth of at least one of said first light source means and said second light source means is greater than the Brillouin gain bandwidth of said optical fiber to be measured.

* * * * *